United States Patent
Takahara

(10) Patent No.: US 8,614,947 B2
(45) Date of Patent: Dec. 24, 2013

(54) APPARATUS FOR TRANSMITTING PACKET

(75) Inventor: Koji Takahara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 159 days.

(21) Appl. No.: 13/116,502

(22) Filed: May 26, 2011

(65) Prior Publication Data

US 2011/0305151 A1 Dec. 15, 2011

(30) Foreign Application Priority Data

Jun. 11, 2010 (JP) ................. 2010-133514

(51) Int. Cl.
- H04J 3/14 (2006.01)
- H04L 1/00 (2006.01)
- H04L 12/26 (2006.01)
- H04L 12/54 (2013.01)
- G06F 15/177 (2006.01)

(52) U.S. Cl.
USPC ........... 370/231; 370/235; 370/252; 370/412; 709/232; 709/238

(58) Field of Classification Search
USPC .......... 370/231, 235, 252, 412; 709/232, 238; 714/781
See application file for complete search history.

(56) References Cited

U.S. PATENT DOCUMENTS

| 6,085,221 A * | 7/2000 | Graf .............................. 709/202 |
| 2007/0019550 A1 | 1/2007 | Enomoto |
| 2007/0253333 A1* | 11/2007 | Fortin et al. ................ 370/230.1 |
| 2009/0116489 A1* | 5/2009 | Hanks .......................... 370/394 |
| 2011/0219287 A1* | 9/2011 | Srinivas et al. ............... 714/781 |

FOREIGN PATENT DOCUMENTS

| JP | 2004-186882 A | 7/2004 |
| JP | 2007-13449 A | 1/2007 |

* cited by examiner

Primary Examiner — Alpus H Hsu
Assistant Examiner — Walter Divito
(74) Attorney, Agent, or Firm — Fujitsu Patent Center

(57) ABSTRACT

A packet transmitting apparatus including a receiving unit for receiving a packet; a determining unit for determining whether an elapsed time t is longer than a first threshold time $X \cdot T1$; and a transmitting unit for transmitting the unsent packet without delaying the transmission of the unsent packet when the determining unit determines that the elapsed time t is longer than the first threshold time $X \cdot T1$, and transmitting the unsent packet after delaying the transmission of the unsent packet when the elapsed time determining unit determines that the elapsed time t is shorter than the first threshold time $X \cdot T1$.

16 Claims, 25 Drawing Sheets

FIG. 3

| PORT NUMBER OF TRANSMISSION DESTINATION | BASE ADDRESS OF QUEUE | X-1 PACKET NO PACKETS EARLIER | IMMEDIATELY PRECEDING PACKET NO | TIME (0) | TIME (1) | TIME (2) | ... | TIME (X-1) |
|---|---|---|---|---|---|---|---|---|
| 28001 | 0x......... | 0 | X-1 | S | S | S | ... | S |
| 28002 | 0x......... | 0 | X-1 | S | S | S | ... | S |
| 28003 | 0x......... | 0 | X-1 | S | S | S | ... | S |
| .. | .. | .. | .. | .. | .. | .. | .. | .. |
| 28009 | 0x......... | 0 | X-1 | S | S | S | ... | S |
| 280010 | 0x......... | 0 | X-1 | S | S | S | ... | S |

FIG. 7

| TIME | Q1 | Q2 | PACKET INTERVAL BETWEEN PACKETS TRANSMITTED TO DESTINATION FROM DELIVERY SERVER |
|---|---|---|---|
| Zms | NO | NO | [1] 10ms [1] 10ms ... |
| Z+10-0ms | [1] | NO | 10ms [1] 10ms [1] 10ms ... |
| Z+20-0ms | [2] | NO | 20ms [1] 10ms [1] 10ms ... |
| ... | | | |
| Z+100-0ms | [10] | NO | 100ms [10] ← TWO PACKETS DISCARDED AT RELAY B |
| Z+100+0ms | NO | NO | 100ms [1] 10ms [1] 10ms [1] 10ms ... |

FIG. 8

| TIME | Q1 | Q2 | PACKET INTERVAL BETWEEN PACKETS TRANSMITTED TO DESTINATION FROM DELIVERY SERVER |
|---|---|---|---|
| Zms | NO | 100 | 1  10ms  1  10ms  1  10ms  1  10ms ... |
| Z+10+0ms | 1 | 100 | 10ms  1  10ms  1  10ms  1  10ms ... |
| Z+20+0ms | 2 | 100 | 1  10ms  1  10ms  1  10ms ... |
| ... | | | 90ms |
| Z+90+0ms | 9 | 100 | 1  10ms  1  10ms  1  10ms  1  10ms ... |
| Z+100+0ms | NO | 109 | 100ms  1  10ms  1  10ms ... |
| Z+110+0ms | NO | 109 | 1  10ms  1  10ms ... |
| Z+120+0ms | NO | 109 | 1  10ms ... |

FIG. 9

| PORT NUMBER OF TRANSMISSION DESTINATION | BASE ADDRESS OF QUEUE | PACKET NUMBER 7 PACKETS EARLIER | IMMEDIATELY PRECEDING PACKET NUMBER | TIME (0) | TIME (1) | TIME (2) | TIME (3) | TIME (4) | TIME (5) | TIME (6) | TIME (7) |
|---|---|---|---|---|---|---|---|---|---|---|---|
| 28001 | 0x...... | 1 | 0 | Z-80ms | Z-70ms | Z-60ms | Z-50ms | Z-40ms | Z-30ms | Z-20ms | Z-10ms |

FIG. 11

| PORT NO OF TRANSMISSION DESTINATION | BASE ADDRESS OF QUEUE | PACKET NUMBER X-1 PACKETS EARLIER | IMMEDIATELY PRECEDING PACKET NUMBER | TIME (0) | TIME (1) | TIME (2) | ... | TIME (X-1) |
|---|---|---|---|---|---|---|---|---|

FIG. 16

| PORT NUMBER OF TRANSMISSION DESTINATION | BASE ADDRESS OF QUEUE | PACKET NUMBER X-1 PACKETS EARLIER | IMMEDIATELY PRECEDING PACKET NUMBER | TIME (0) | TIME (1) | TIME (2) | ... | TIME (X-1) |
|---|---|---|---|---|---|---|---|---|
| 28001 | 0x...... | 0 | X-1 | S | S | S | | S |

# APPARATUS FOR TRANSMITTING PACKET

CROSS-REFERENCE TO RELATED APPLICATION

This application is based upon and claims the benefit of priority of the prior Japanese Patent Application No. 2010-133514, filed on Jun. 11, 2010, the entire contents of which are incorporated herein by reference.

FIELD

The embodiments discussed herein are related to a packet transmitting apparatus and a packet transmitting method, and non-transitory computer-readable recording medium storing a packet transmitting program for implementing the packet transmitting apparatus in a central processing unit.

BACKGROUND

One of the problems related to the streaming delivery such as moving image delivery is a burst problem. For example, if a large number of packets are delivered in a short period time, a buffer (queue) of relays (including a switch, a router, and a converter) and a transmission destination apparatus overflow. An overflow packet is discarded, and as a result, a reproduced image in the moving image delivery is subject to an image disturbance. This is referred to as the burst problem.

Techniques called traffic shaving and traffic policing to alleviate the burst problem are known. In the traffic shaving technique, a packet to be transmitted is temporarily stored on a buffer, and is then transferred at a constant time interval. In the traffic policing technique, packets are discarded if traffic increases above a constant rate.

An underflow (a scarce state of packets dwelling on the queue) causes a failure in the transmission of the packets at regular intervals. Traffic shaving is implemented to cause a large number of packets to continuously dwell on a queue and to prevent underflow. For this reason, in traffic shaving, the transmission is performed in a state that a delay of time corresponding to a large number of packets dwelling on the queue continuously occurs. If the transmission is interrupted for a certain period of time for any reason in traffic shaving, the number of packets dwelling on the queue is increased even more.

Packet discarding tends to occur in traffic policing. Since a large number of packets are unlikely to be discarded at a time in traffic policing, the possibility of a large image distortion is small. But a small-scale image distortion is still likely to happen because of a small number of discarded packets.

Related arts are described in Japanese Laid-open Patent Publication Nos. 2004-186882 and 2007-13449.

SUMMARY

A packet transmitting apparatus including a receiving unit for receiving a packet; a determining unit for determining whether an elapsed time t is longer than a first threshold time X·T1, the elapsed time t is a time elapsed from the transmission time of a packet transmitted earlier than the latest transmitted packet by X−1 packets, X being the number of packets that a minimum storage capacity queue can store, the minimum storage capacity queue is a queue having a smallest storing capacity among queues for temporarily storing received packets on a transmission pass to the transmission destination apparatus, and T1 being a time interval with which packets stored in the minimum storage capacity queue are successively extracted; and a transmitting unit for transmitting the unsent packet without delaying the transmission of the unsent packet when the determining unit determines that the elapsed time t is longer than the first threshold time X·T1, and transmitting the unsent packet after delaying the transmission of the unsent packet when the elapsed time determining unit determines that the elapsed time t is shorter than the first threshold time X·T1.

The object and advantages of the various embodiments will be realized and attained by means of the elements and combinations particularly pointed out in the claims.

It is to be understood that both the foregoing general description and the following detailed description are exemplary and explanatory and are not restrictive of the various embodiments, as claimed.

BRIEF DESCRIPTION OF DRAWINGS

FIG. 3 illustrates an example of a control table;

FIG. 7 illustrates a transmission process performed with a transmission interval unadjusted;

FIG. 8 illustrates an operation example with traffic shaving applied;

FIG. 9 illustrates a control table at time Z ms;

FIG. 11 illustrates an initial state of the control table of a first modification of the second embodiment;

FIG. 16 illustrates a control table in a fourth modification of the second embodiment;

DESCRIPTION OF EMBODIMENTS

The embodiments of the invention are described below.

Figure 1:
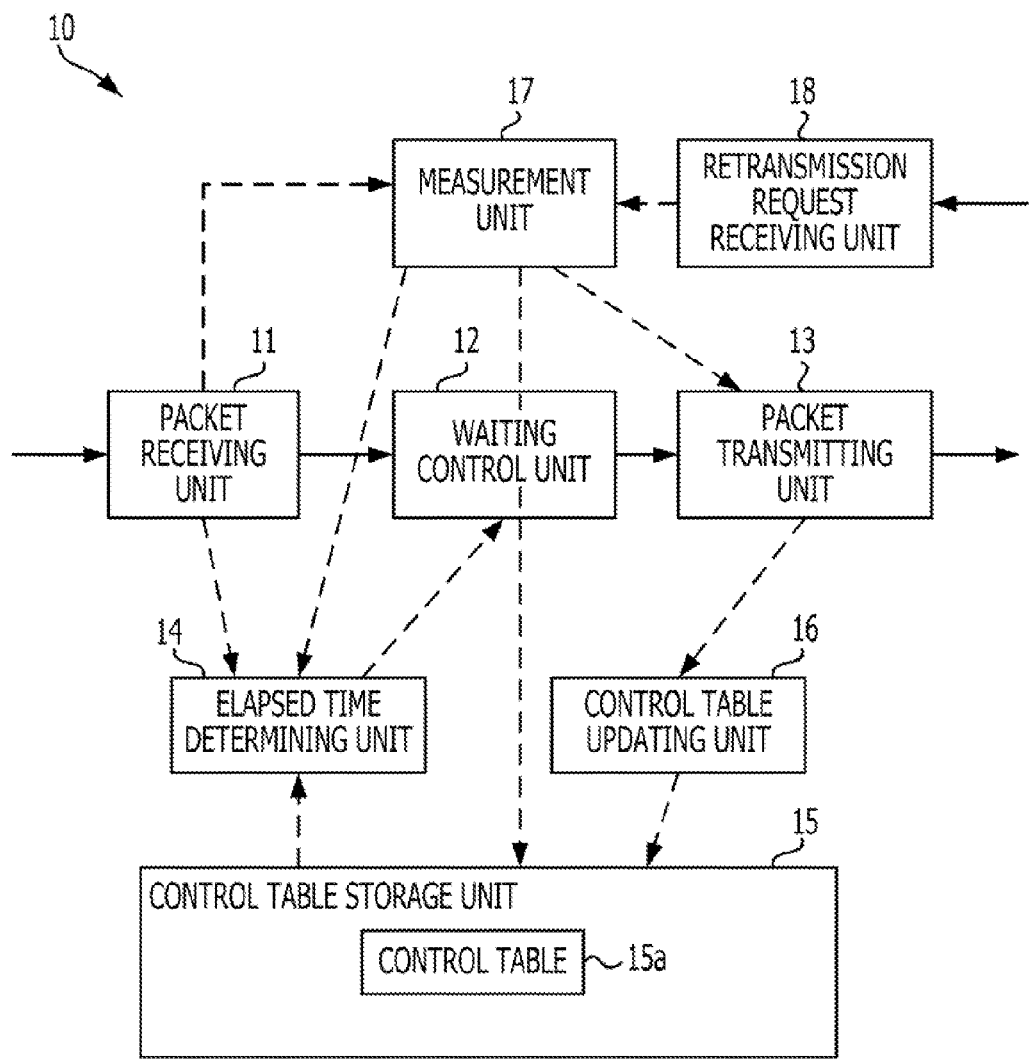
FIG. 1 is a functional block diagram of a packet transmitting apparatus of a first embodiment.

FIG. 1 is a functional block diagram of a packet transmitting apparatus 10 of a first embodiment.

As illustrated in FIG. 1, an arrow-headed solid line represents a flow of transmission data (packet), and an arrow-headed broken line represents other data (control information).

The packet transmitting apparatus 10 of FIG. 1 includes a packet receiving unit 11, a waiting control unit 12, and a packet transmitting unit 13.

The packet receiving unit 11 receives a packet.

If a condition to be discussed later is satisfied, the waiting control unit 12 performs a waiting process. In the waiting process, the waiting control unit 12 delays the transmission of a packet received by the packet receiving unit 11 rather than causing the packet transmitting unit 13 to transmit the packet immediately.

The packet transmitting unit 13 transmits the packet transferred from the waiting control unit 12 to a transmission destination apparatus (not illustrated).

The packet transmitting apparatus 10 of FIG. 1 further includes an elapsed time determining unit 14. The elapsed time determining unit 14 determines a condition that causes the waiting control unit 12 to perform the waiting process. In the condition determination, the following parameters are defined. A processor may be used for configuring the elapsed time determining unit 14 as an example.

X: represents a number of packets that a minimum storage capacity queue permits to be stored. The minimum storage capacity queue is a queue having a smallest storage capacity among the queues that temporarily store received packets. The queues dwell on a transmission path before the received packets are transmitted to the transmission destination apparatus. The transmission path is described later with reference to a second embodiment.

T1: represents a time interval with which packets stored in the minimum storage capacity queue are successively extracted.

t: represents an elapsed time lasting to the present time from the transmission time of a packet transmitted earlier than the latest transmitted packet by X−1 packets.

X·T1: represents a first threshold time, where X·T1 is the product of the multiplicand X and the multiplier T1.

The elapsed time determining unit 14 determines whether the elapsed time t is longer than the first threshold time X·T1.

If the elapsed time determining unit 14 determines that the elapsed time t is shorter than the first threshold time X·T1, the waiting control unit 12 performs the waiting process to delay the transmission of the packet transferred from the packet receiving unit 11.

If the elapsed time determining unit 14 determines that the elapsed time t is longer than the first threshold time X·T1, the packet transmitting unit 13 transmits an unsent packet with the waiting process of the waiting control unit 12 skipped. In such a case, the packet transmitting unit 13 transmits the unsent packet after directly receiving the unsent packet from the waiting control unit 12. If the elapsed time determining unit 14 determines that the elapsed time t is shorter than the first threshold time X·T1, the packet transmitting unit 13 transmits the unsent packet after the waiting control unit 12 has performed the waiting process.

More parameters are defined herein.

T: represents a packet mean reception time interval of the packet receiver 11.

T2: represents a time interval satisfying condition of T1<T2<T. for example, T2=(T1+T)/2.

More specifically, if the elapsed time determining unit 14 determines that the elapsed time t is shorter than the first threshold time X·T1, the waiting control unit 12 performs the waiting process to keep the transmission of the unsent packet waiting for a waiting time of (a second threshold time X·T− the elapsed time t) starting with the present time.

The packet transmitting apparatus 10 of FIG. 1 further includes a control table storage unit 15 and a control table updating unit 16. The control table storage unit 15 stores a control table 15a. The control table 15a lists transmission times of X transmitted packets counting from the transmitted packet earlier than the latest transmitted packet by X−1 transmitted packets down to the latest transmitted packet. The control table updating unit 16 updates the transmission time in the control table in response to the transmission of the unsent packet by the packet transmitting unit 13.

By referencing the control table 15a, the elapsed time determining unit 14 determines the transmission time of the packet transmitted earlier by X−1 packets, and calculates the elapsed time t. The elapsed time determining unit 14 then determines whether the elapsed time t is longer than the first threshold time X·T1.

If a plurality of packet transmission destinations are present, transmission times of packets transmitted to the transmission destinations are listed respectively on the spaces of the transmission destinations in the control table 15a. The control table updating unit 16 then updates the transmission times in the control table 15a on a per transmission destination basis.

If a transmission destination is known, the known transmission destination is recorded as an initial setting in the control table 15a. If no transmission destination is known, the control table updating unit 16 is caused to monitor the transmission destination of a packet. When a packet to be transmitted to a new transmission destination is detected, a new space corresponding to the new transmission destination is added to the control table 15a.

A specific example of the control table 15a is described later with reference to the second embodiment.

The packet transmitting apparatus 10 of FIG. 1 further includes a measurement unit 17 and a retransmission request receiving unit 18. The retransmission request receiving unit 18 receives a retransmission request of a packet transmitted from the packet transmitting unit 13 to the transmission destination. Upon receiving a retransmission request, the retransmission request receiving unit 18 notifies the measurement unit 17 that the retransmission request has been received.

The measurement unit 17 has three functions as below. (1) The measurement unit 17 functions as a mean reception time interval calculating unit to calculate a packet mean reception time interval T. (2) The measurement unit 17 functions as a storage capacity packet count detecting unit to calculate a storage capacity packet count X. (3) The measurement unit 17 functions as a queue extraction time detecting unit to detect the time interval T1.

The measurement unit 17 performs the process described below in order to calculate (1) packet mean reception time interval T. The measurement unit 17 calculates the mean value of reception time intervals of a plurality of packets successively received by the packet receiving unit 11. The calculated mean value is the packet mean reception time interval T.

In order to calculate (2) storage capacity packet count X, the measurement unit 17 performs the process described below. More specifically, the measurement unit 17 causes the packet transmitting unit 13 to repeat a process to transmit a plurality of packets to the transmission destination apparatus substantially at the same time with the number of packets transmitted substantially at the same time successively changed, and the measurement unit 17 detects a maximum packet count free from a retransmission request. The maximum packet count free from a retransmission request is the storage capacity packet count X of the minimum storage capacity queue out of the queues dwelling on a transmission path before the received packets are transmitted to the transmission destination apparatus.

In order to calculate (3) time interval T1, the measurement unit 17 performs the process as described below. The measurement unit 17 causes the packet transmitting unit 13 to repeat a process to transmit a plurality of packets with specific time intervals with the number of packets and the specific time interval changed. The measurement unit 17 thus detects the shortest time interval with which no retransmission request is detected if the number of packet is increased. The shortest time interval is the time interval T1.

The packet transmitting apparatus 10 of the first embodiment illustrated in FIG. 1, including the measurement unit 17, determines the packet mean reception time interval T, the storage capacity packet count X, and the time interval T1. In a system where these values are known, the measurement unit 17 becomes unnecessary.

The values T, X, and T1 thus determined by the measurement unit 17 are used in the process performed by the waiting control unit 12 and the elapsed time determining unit 14 and serve as indexes of the values of transmission times recorded in the control table 15a in the control table storage unit 15. The control table 15a is described in connection with the second embodiment described below.

The packet transmitting apparatus 10 has been described. The process performed by the packet transmitting apparatus 10 may also be understood as a packet transmitting method. The packet transmitting apparatus 10 of FIG. 1 may be understood as a packet transmitting program implementing the packet transmitting apparatus in an arithmetic processing apparatus if a central processing unit (CPU) performing the program is mounted in the arithmetic processing apparatus.

The first embodiment has been discussed. The second embodiment is discussed below.

Figure 2:
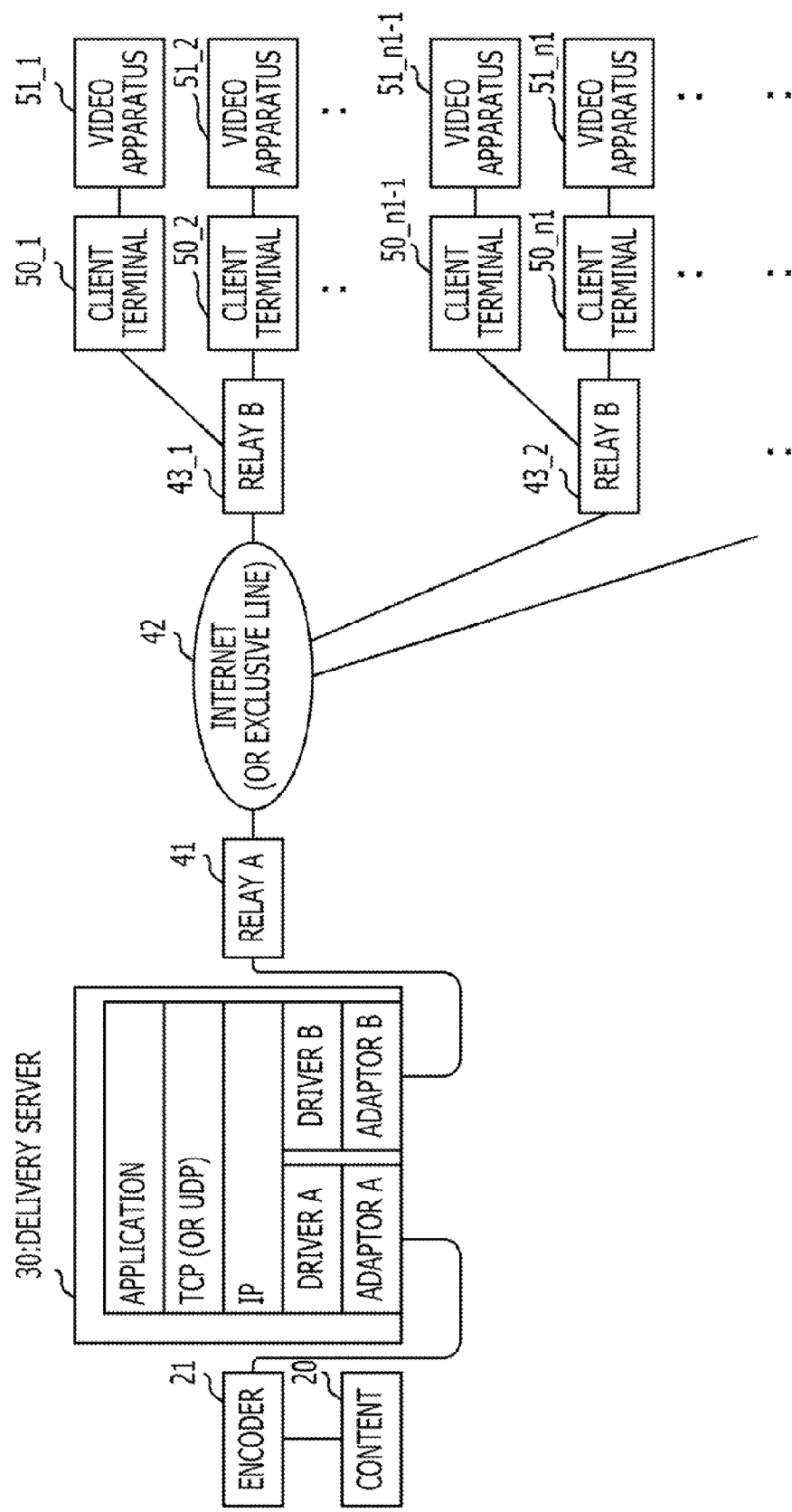
FIG. 2 is a block diagram of an entire system of a second embodiment.

FIG. 2 is a block diagram of the entire system of the second embodiment.

A packet is captured into an encoder 21 from content 20 (moving image content here). A delivery server 30 receives the packet from the encoder 21. The encoder 21 may represent a content storage device. The content storage device may accumulate a large number of content units, and stream-delivers packets, each representing a content unit responsive to a request to a request source.

The packet arrived at the delivery server 30 is received by an adaptor A, and then by a driver A. The driver A then transfers the packet to Internet Protocol (IP), and further to Transmission Control Protocol (TCP). User Datagram Protocol (UDP) may also be used instead of TCP. TCP is used in the embodiment in principle.

TCP is a protocol for unicast transmission. One port number thus indicates one transmission destination apparatus. In TCP, if a packet is missing on a transmission path, a retransmission process of the packet is performed.

In UDP, multi-cast transmission is typically performed, and one port number indicates a plurality of transmission destination apparatuses. No retransmission process is performed in standard operation in UDP. A transmission source can become aware of a missing packet if a packet loss detection program is introduced in a transmission destination apparatus. The packet loss detection program returns detection results if a packet loss is detected.

The packet handed to TCP of the delivery server 30 is routed to an application program, and then proceeds to TCP, and then IP in reverse. The packet proceeds to a driver B, and then an adaptor B. The packet is then transmitted from the delivery server 30 to a transmission destination apparatus (one of client terminals 50_1, 50_2, . . . , 50_n).

The packet transmitted from the delivery server 30 passes via a relay A41, Internet 42 (or an exclusive line), and one of relays B 43_1, 43_2, . . . and is then received by one of the client terminals 50_1, 50_2, . . . , 50_n. The received packet is visualized into an image by one of video apparatuses 51_1, 51_2, . . . , 51_n−1, 51_n, . . . connected to that client terminal.

The delivery server 30 includes hardware elements, performing an arithmetic operation, such as unillustrated CPU and memory.

The driver A, IP, TCP (UDP), and the application program illustrated in FIG. 2 represent software programs executed on the hardware elements. For simplicity of explanation, a function performed by the CPU that executes a software program is described below without any particular distinction from the software program itself.

The function performed by the driver B is discussed first, followed by the discussion of modification of the embodiment.

In the discussion that follows, the parameters X, T, T1, T2, and t remain unchanged from those described with reference to the first embodiment. Parameters X, T, and T1 are those already known by a user, and specified by configuration properties of the driver B. Alternatively, the parameters X, T, and T1 may be determined using a method to be discussed later, and specified by the user or the application software.

FIG. 3 illustrates an example of the control table.

The discussion here is based on the premise that the transmission destination port and the variety of parameters are already known by the user, and specified by the configuration properties of the driver B. Alternatively, the transmission destination port and the variety of parameters may be known by the application program, and the application program may specify the transmission destination port, and the variety of parameters to the driver B.

A "transmission destination port number" in the control table of FIG. 3 is specified by the user or the application program. A row as a space is arranged for each transmission destination port number in the control table. Values described below are recorded on each transmission destination port number. The driver B may produce on a memory (not illustrated) a queue temporarily storing a packet for each transmission destination port number. An address representing a location of a queue generated on the memory is recorded in a "base address of queue."

A "packet number X−1 packets earlier" is the packet number of a packet transmitted earlier than the latest transmitted packet by X−1 packets. The packet number is specified by any number of from 0 to X−1. Each time a packet is transmitted, the packet number is incremented as follows: 0→1→ . . . →X−1. Upon reaching X−1, the packet number reverts back to zero (0). Here, 0, 1, . . . , X−1 respectively correspond to time (0), time (1), . . . , time (X−1). As illustrated in FIG. 3, initial values are 0's.

A "latest packet number" is a packet number of a latest transmitted packet. The "latest packet number" is circularly updated in the order of 0→1→ . . . →X−1→0→1→ . . . "X−1" is recorded at each of the "latest packet numbers" as initial values in FIG. 3.

"Time (0)," "time (1)," . . . , "time (X−1)" are transmission times of the transmitted packets of the packet numbers 0, 1, . . . , X−1. Initial values of the transmission times are all "S" in FIG. 3. The initial value S sufficiently precedes in time the start time of packet transmission and reception. For example, the delivery server 30 of FIG. 2 may operate at time 0. If the packet transmission and reception are not to start within a few minutes from the startup, the initial value may be S=0.

If one unsent packet is transmitted, the present time is recorded at time responsive to a packet number recorded at the "latest packet number", and 1 is added to the "packet number X−1 packets earlier" and to the "latest packet number." If a value of "latest packet number" X−1 with 1 added thereto changes to X, the packet number turns to 0.

It is assumed that the minimum storage capacity queue having the smallest storage capacity is present in each of the relays B43_1, 43_2, . . . in FIG. 2. Further, it is assumed that the packet storage capacity of the minimum storage capacity queues of the relays B 43_1, 43_2, . . . are the same number X.

Figure 4:
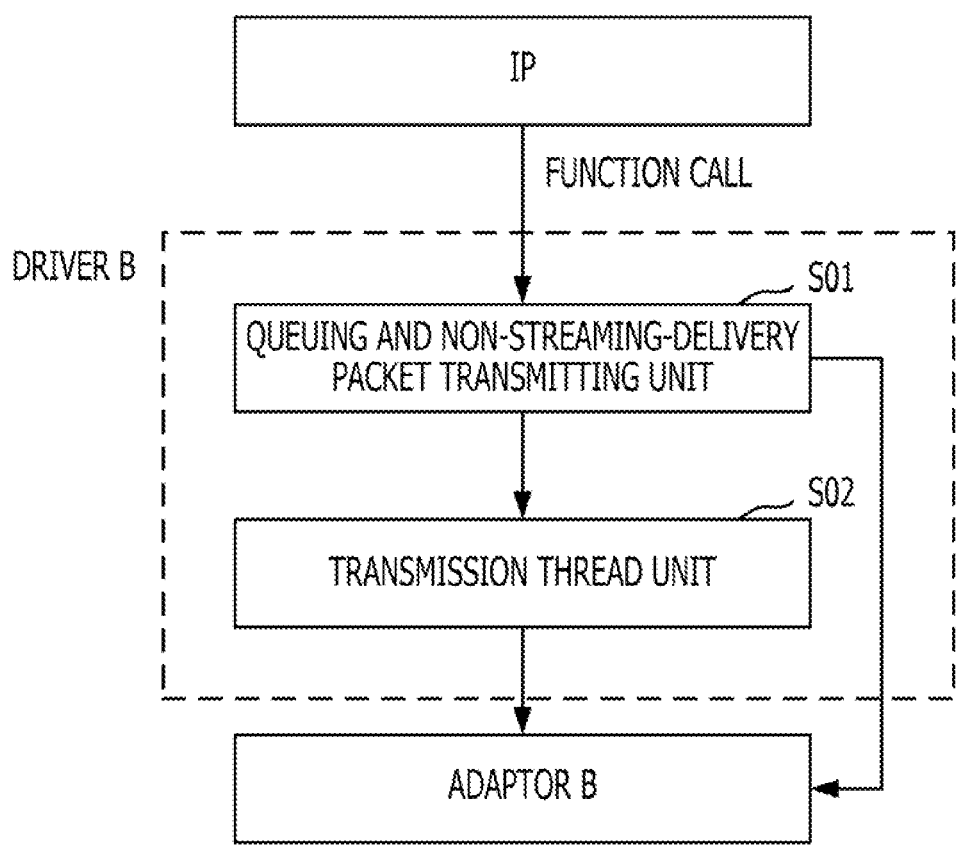
FIG. 4 is a flowchart illustrating a transmission process of a driver in a delivery server.

FIG. 4 is a flowchart illustrating a transmission process of the driver B in the delivery server.

The driver B performs the transmission process of FIG. 4 in response to a function call from the IP.

The transmission process includes a queuing and non-streaming-delivery packet transmitting operation (operation S01), and a transmission thread operation (S02).

Figure 5:
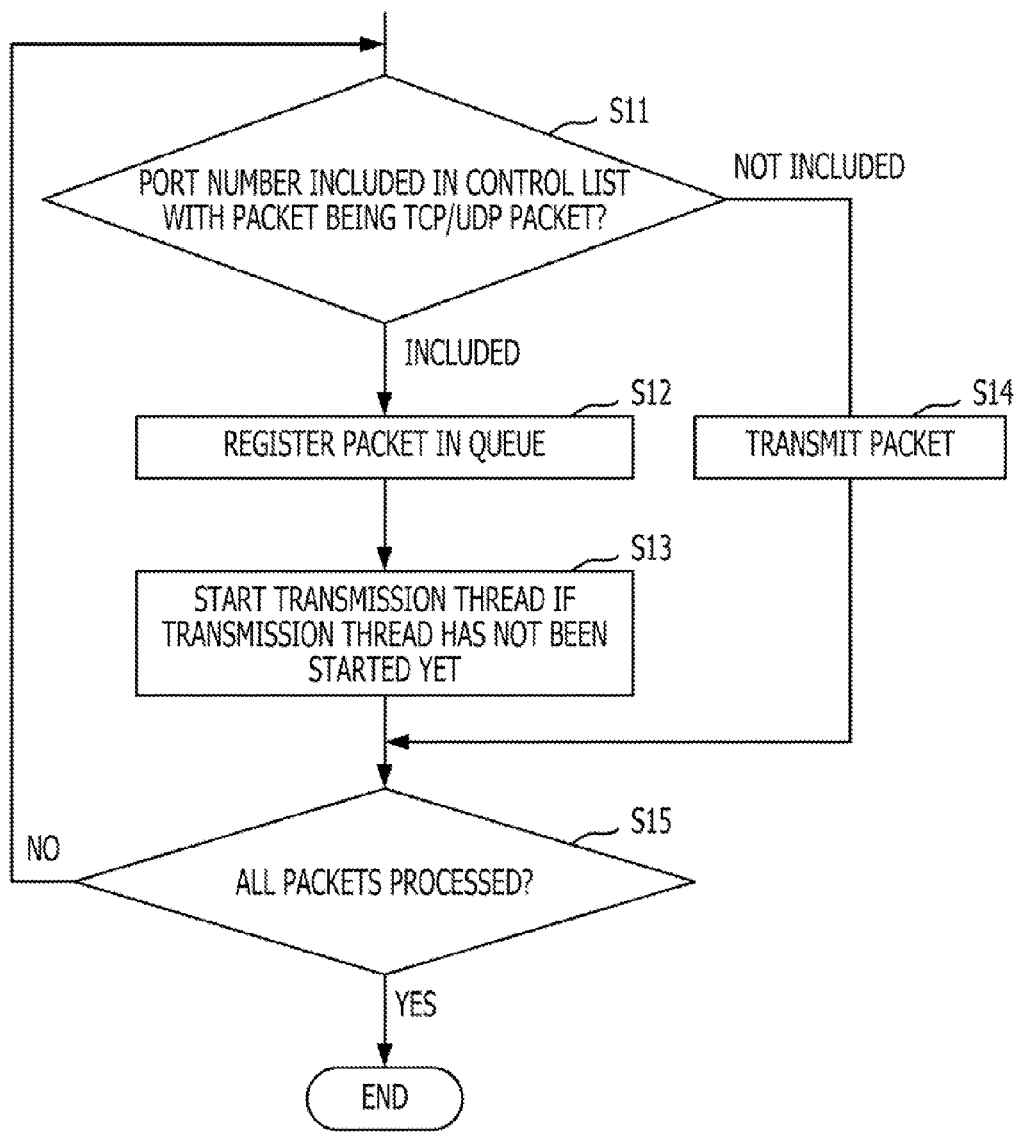
FIG. 5 is a flowchart illustrating a "queuing and non-streaming-delivery packet transmitting unit" of the transmission process of FIG. 4.

FIG. 5 is a flowchart of the "queuing and non-streaming-delivery packet transmitting unit" (operation S01) of the transmission process of FIG. 4.

In FIG. 5 and subsequent figures, "TCP/UDP" refers to TCP if TCP is used in stream delivery, and refers to UDP if UDP is used in stream delivery.

It is determined whether a packet currently being transmitted is a TCP/UDP packet, and whether a port number is a port number listed in the control table (see FIG. 3) (operation S11).

If the condition in operation S11 is satisfied, the packet is registered in a queue in which packets to be transmitted are arranged (operation S12). If no transmission thread has been started, a transmission thread is started (operation S13). The transmission thread is a program that performs the process of the transmission thread unit (operation S02) of FIG. 4. The process of the transmission thread (operation S02) is described below.

The condition in operation S11 may not be satisfied, if the packet to be transmitted is a packet other than the TCP/UDP packet as a control target. Even if the packet to be transmitted is a TCP/UDP packet, the packet may have a port number other than the port numbers registered in the control table as control targets. In such cases, processing proceeds to operation S14. The packet transmission process similar to related art technique is performed.

The process described above is repeated to all the packets to be transmitted (operation S15).

Figure 6:
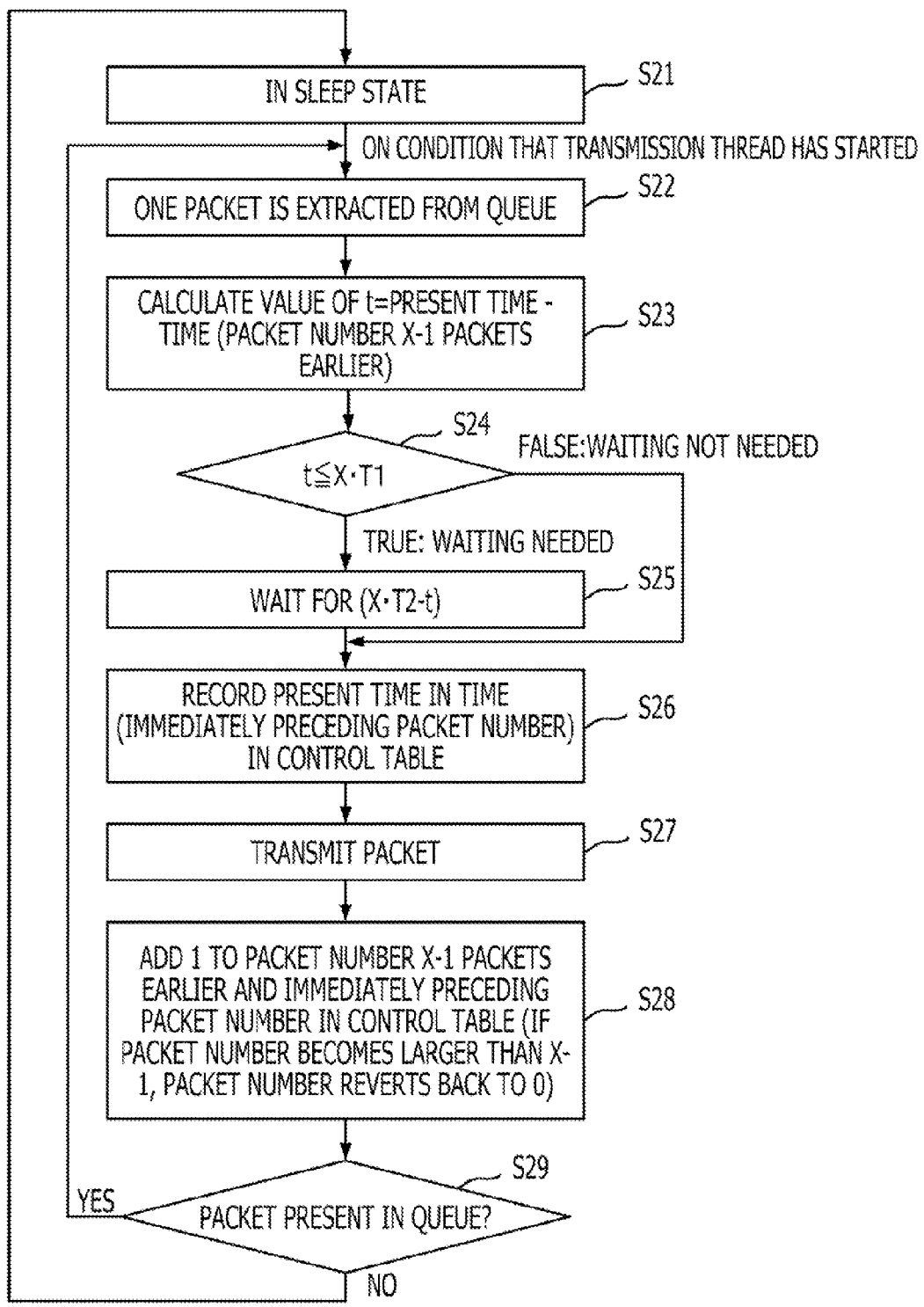
FIG. 6 is a flowchart illustrating a process of a transmission thread unit of FIG. 3.

FIG. 6 is a flowchart illustrating the process of the transmission thread (operation S02) of FIG. 4.

It is assumed herein that the transmission thread is initially in a sleep state (operation S21).

If the transmission thread is triggered in operation S15 of FIG. 5, the transmission thread starts up. The process is initiated starting with operation S22.

One packet is first extracted from the queue (operation S22). Then, the elapsed time t from the transmission time of the packet transmitted earlier than the latest transmitted packet by X−1 packets down to the latest transmitted packet is calculated (operation S23). The control table of FIG. 3 is referenced and the elapsed time t is calculated from t=present time−time (packet number X−1 packets earlier).

The elapsed time t thus calculated is compared with the first threshold time X·T1 (operation S24). If t≤X·T1, waiting is needed, and the waiting time is (X·T2−t) (operation S25). If t>X·T1, no waiting is needed, and operation S25 is skipped.

The present time as the transmission time is recorded at time (the latest packet number) (operation S26) in the control table (see FIG. 3), followed by the packet transmission process (operation S27).

In the control table, 1 is added to the packet number X−1 packets earlier, and the latest packet number (operation S28). If the addition of 1 results in a value higher than X−1, the packet number reverts back to 0.

It is then determined in operation S29 whether an unsent packet remains in the queue. If a packet remains in the queue, processing returns to operation S22. One of the unsent packets is then extracted, and the process described above is repeated.

If it is then determined in operation S29 that no unsent packet remains in the queue, processing returns to operation S21. The transmission thread is back into a sleep state.

The length from the head to the tail of the X consecutive packets is longer than X·T1 in the process of FIG. 6. As long as the packets arrive at the relay B with the packet interval unchanged, the queue in the relay B is free from overflowing.

If the length from the head to the tail of the X consecutive packets is longer than X·T1, at least one empty space is available in the queue of the relay B when any one packet arrives at the relay B. This fact is explained as below. At least an interval of X·T1 is present between one packet and a preceding packet earlier than the one packet by X−1 packets. When the preceding packet earlier than the one packet by X−1 packets arrives at the relay B, the preceding packet earlier than the one packet by X−1 packets may be registered at the tail of the queue of the relay B. When the one packet arrives at the relay B, the packet earlier than the one packet by X−1 packets is already extracted out of the relay B. At the moment any packet arrives at the relay B, at least one empty space is available in the queue of the relay B. The queue of the relay B is thus prevented from overflowing in the process of FIG. 6.

A packet transmission operation example of the packet transmission process of FIGS. 4 to 6 is described together with a comparative operation example.

FIG. 7 illustrates the transmission of packets with the transmission intervals thereof unadjusted. FIG. 7 thus illustrates the comparative example to the embodiment. The comparative example of FIG. 7 is referred to as a first comparative example.

Figure 10:
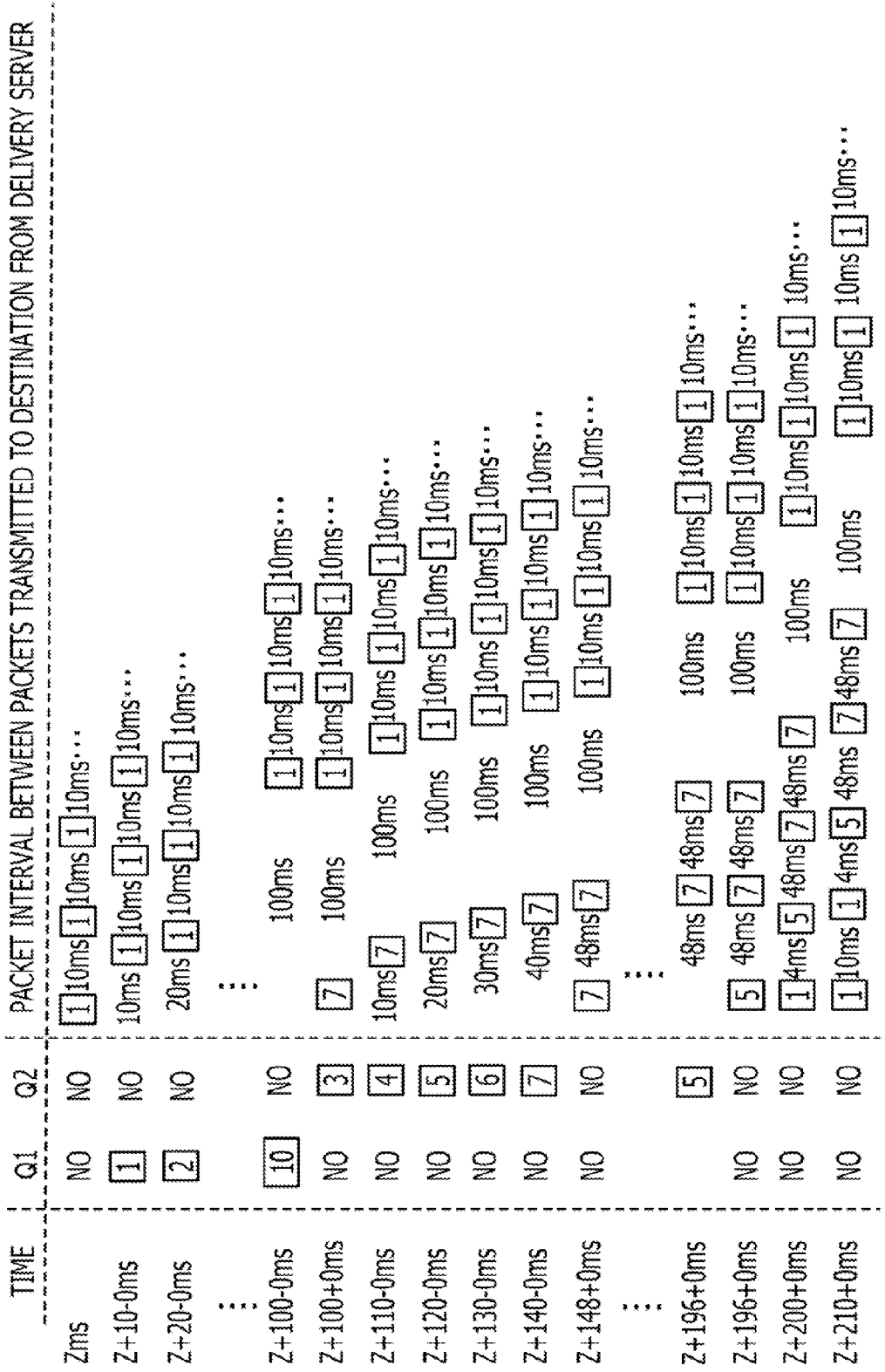
FIG. 10 illustrates a specific example of the transmission process of FIGS. 4 to 6.

Symbols used in the discussion of FIGS. 7, 8, and 10 are defined as below.

The meanings of the parameters T, X, T1, T2, and t are identical to those described with reference to the first embodiment.

Here, ms stands for milliseconds. The parameters here are T=10 ms, and the queue of the relay B is a minimum storage capacity queue with X=8, T1=4 ms, and T2=6 ms.

Q1 is a queue of IP of the delivery server 30. In Q1 column, "no," "1," "2," and the like refer to the packet counts of the packets arranged in the queue Q1.

Q2 is a queue of the driver B of the delivery server 30. In the Q2 column, "no," "100," and the like (see FIG. 8) refer to the packet counts of the packets arranged in the queue Q2. The packet count here includes an unsent packet immediately subsequent to being extracted from the queue Q2.

Times Z+10−0 ms, Z+20−0 ms, . . . (see FIG. 7), each suffixed with −0 ms, mean that times Z+10−0 ms, Z+20−0 ms, . . . are slightly earlier than times Z+10 ms, Z+20 ms, . . . , respectively.

Times Z+10+0 ms, Z+20+0 ms, . . . (see FIG. 8), each suffixed with +0 ms, mean that times Z+10+0 ms, Z+20+0 ms, . . . are slightly later than times of Z+10 ms, Z+20 ms, . . . , respectively.

The packets discussed here have the same transmission destination port number, transmission destination port number 28001.

At time Z ms, several packets have been transmitted. Prior to time Z ms, packets are received with equal time intervals of 10 ms, pass queues Q1 and Q2, and then are transmitted also with equal time intervals of 10 ms from the delivery server 30. Subsequent to time Z ms, packets arrive at the queue Q1 with equal time intervals. It is assumed that packets arrive at the queue Q1 at times Z+10−0 ms, Z+20−0 ms, . . . , slightly earlier than times Z+10 ms, Z+20 ms, . . . , respectively.

From any time point somewhere between time Z ms and time Z+10 ms (time Z+5 ms, for example) to time Z+100−0 ms, it is assumed that the CPU is not assigned the transmission process of the driver B but is assigned a software program that is unrelated to the packet transmission and has a higher priority. In such case, the transmission process may be suspended.

The packet transmission performed without adjusting the transmission intervals is illustrated in FIG. 7.

With reference to FIG. 7, packets having arrived from time Z+10−0 ms to Z+100−0 ms remain stored in the queue Q1 because the transmission process is suspended. The CPU is assigned to the transmission process at time Z+100−0 ms. At time Z+100+0 ms, 10 packets stored in Q1 are transmitted to the outside from the delivery server 30 substantially at the same time.

In this case, two packets (10−8=2) are discarded at the relay B having the minimum storage capacity (X=8).

FIG. 8 illustrates an operation example in which traffic shaving is applied. The same condition as the condition of FIG. 7 is also applied.

In traffic shaving, packets are temporarily stored in the queue, and the packets are then transmitted with equal time intervals as described above. In the operation example of FIG. 8, 100 packets are stored in the queue Q2, and then are transmitted with time intervals of 10 ms. New packets arrive with the same time intervals of 10 ms.

With reference to FIG. 8, packets having arrived from time Z+10−0 ms to Z+100−0 ms remain stored in the queue Q1 because the transmission process is suspended. Since the transmission process is suspended, packets in Q2 also remain stored. The packet transmission from the delivery server 30 to the outside is also suspended. When the transmission process resumes at time Z+100−0 ms, at time Z+100+0 ms immediately subsequent to the resumption of the transmission process, 10 packets heretofore stored in Q1 including a packet having arrived at Q1 at time Z+100−0 ms are transferred to Q2. When the transmission process resumes, one packet is extracted from Q2 and transmitted to the outside from the delivery server 30 at time Z+100+0 ms. Packets are hereafter extracted from Q2 and then transmitted with time intervals of 10 ms.

After packets are transmitted from 30, no packet loss takes place on the transmission path. An interrupted packet delivery is likely to cause an image distortion. Q2 stores packets larger in number than the packets prior to the interruption. The transmission process is further delayed accordingly in general operation.

Specific examples of the transmission process of FIGS. 4 to 6 are described below.

FIG. 9 illustrates the control table at time Z ms. The control table illustrated herein is related to the transmission destination port number 28001 only.

FIG. 10 illustrates the specific operation example of the transmission process of FIGS. 4 to 6. The same condition as the condition of FIG. 7 is applied here.

The packet having arrived at IP at time Z−0 ms is immediately transferred to the driver B. The driver B performs the "queuing and non-streaming-delivery packet transmitting operation" of FIG. 4 (operation S01), i.e., the process of the flowchart of FIG. 5. Processing proceeds to operation S11 to operation S12 in FIG. 5 and the packets are registered in the queue Q2 in the driver B. As processing proceeds to operation S15, the transmission thread is started.

Processing then proceeds to operation S21, operation S22, and operation S23 as illustrated in FIG. 6. More specifically, the transmission thread of the driver B is started from the sleep state (operation S21), the packet is extracted from the queue Q2 (operation S22), and the elapsed time t is calculated as follows: t=present time−time (packet number seven packets earlier)=Z ms−time (1)=Z ms−(Z−70 ms)=70 ms (operation S23).

Since the first threshold time X·T1 is X·T1=8×4=32 ms, t=70 ms>X·T1=32 ms. It is thus determined in operation S24 that the magnitude determination is a false branch (waiting not needed). The waiting process is not performed in operation S25. The present time is recorded at time (latest packet number)=time (0) (operation S26). The packet extracted from the queue Q2 is immediately transmitted (operation S27). In the control table, 1 is added to the packet number 7 packets earlier and the latest packet number, which become 2 and 1, respectively (operation S28).

Since the driver B is not assigned the CPU from any time point somewhere between time Z and time Z+10 ms (time Z+5 ms, for example) to time Z+100−0 ms, the packet transmission process is suspended. At time Z+100−0 ms, 10 packets dwell on the queue Q1 of IP.

At time Z+10+0 ms, the driver B is assigned back the CPU, and the transmission process resumes. 10 packets dwelling on the queue Q1 of IP are transferred to the drive B, and the transmission process of FIGS. 4 to 6 thus resumes.

The determination results from operation S11 of FIG. 5 on all the 10 packets are "included." All the 10 packets are registered in the queue Q2 of the driver B (operation S12). The transmission thread of the driver B is thus started (operation S15).

The elapsed time t calculated in operation S23 of FIG. 6 is calculated for the 10 packets registered in the queue Q2 and the waiting process in operation S25 is skipped for the first through seventh packets as follows:

packet number 1: t=Z+100 ms−time (2)=Z+100−(Z−60)=160 ms>32 ms=X·T1;

packet number 2: t=Z+100 ms−time (3)=Z+100−(Z−50)=150 ms>32 ms=X·T1;

packet number 3: t=Z+100 ms−time (4)=Z+100−(Z−40)=140 ms>32 ms=X·T1;

packet number 4: t=Z+100 ms−time (5)=Z+100−(Z−30)=130 ms>32 ms=X·T1;

packet number 5: t=Z+100 ms−time (6)=Z+100−(Z−20)=120 ms>32 ms=X·T1;

packet number 6: t=Z+100 ms−time (7)=Z+100−(Z−10)=110 ms>32 ms=X·T1; and packet number 7: t=Z+100 ms−time (0)=Z+100−Z=100 ms>32 ms=X·T1.

For the eighth packet, packet number 0: t=Z+100 ms−time (1)=Z+100−(Z+100)=0 ms<32 ms=X·T1. A waiting time of X·T2−=8×6−0=48 ms is inserted.

At times Z+110 ms, Z+120 ms, Z+130 ms, and Z+140 ms during the waiting time of 48 ms, a total of four packets arrive at the driver B one at a time. These packets are registered in the queue Q2 of the driver B in the process of FIG. 5.

At time Z+148 ms, the eighth packet (packet number 0) is transmitted, immediately followed by the transmission of the ninth packet and the tenth packet (packet numbers 1 and 2) because:

packet number 1: t=Z+148 ms−time (2)=Z+148−(Z+100) =48 ms>32 ms=X·T1; and packet number 2: t=Z+148 ms−time (3)=Z+100−(Z+100) =48 ms>32 ms=X·T1.

Four packets (packet numbers 3, 4, 5, and 6) having arrived from time Z+100 ms to time Z+148 ms are also immediately transmitted at time Z+148 ms because:

packet number 3: t=Z+148 ms−time (4)=Z+148−(Z+100) =48 ms>32 ms=X·T1;

packet number 4: t=Z+148 ms−time (5)=Z+148−(Z+100) =48 ms>32 ms=X·T1;

packet number 5: t=Z+148 ms−time (6)=Z+148−(Z+100) =48 ms>32 ms=X·T1; and packet number 6: t=Z+148 ms−time (7)=Z+148−(Z+100) =48 ms>32 ms=X·T1.

For the packet (packet number 7) having arrived at time 150 ms, packet number 7: t=Z+150 ms−time (8)=Z+150−(Z+ 148)=2 ms<32 ms=X·T1. A waiting time of X·T2−t=8×6− 2=46 ms is inserted. The waiting time 46 ms determined herein is a time interval from time Z+150 ms, and the time interval from time Z+148 ms is 48 ms. More specifically, the transmission remains suspended until Z+150 ms+46 ms=Z+ 196 ms.

At times Z+160 ms, Z+170 ms, Z+180 ms, and Z+190 ms during the waiting time, one packet at a time arrives at the driver B. Since the packet having arrived at time Z+150 ms remains unsent, these packets waits in the queue Q2 of the driver.

At time 196 ms, the packet having arrived at time 150 ms (packet number 6) is transmitted. The packets having arrived at times Z+160 ms, Z+170 ms, Z+180 ms, and Z+190 ms are also immediately transmitted because:

packet number 0: t=Z+196 ms−time (1)=Z+196−(Z+148) =48 ms>32 ms=X·T1;

packet number 1: t=Z+196 ms−time (2)=Z+196−(Z+148) =48 ms>32 ms=X·T1;

packet number 2: t=Z+196 ms−time (3)=Z+196−(Z+148) =48 ms>32 ms=X·T1; and packet number 3: t=Z+196 ms−time (4)=Z+196−(Z+148) =48 ms>32 ms=X·T1.

At time 200 ms, one packet arrives at the drive B. That packet is immediately transmitted because:

packet number 4: t=Z+200 ms−time (5)=Z+200−(Z+148) =52 ms>32 ms=X·T1.

The packets arriving at times Z+210 ms, Z+220 ms, Z+230 ms, . . . , with time intervals of 10 ms are immediately transmitted because the value of t (a difference between the present time and the transmission time of the packet seven packets earlier) is not shorter than 32 ms.

According to the embodiment as illustrated in FIG. 10, a large number of packets is prevented from being stored on the delivery server and the discarding of a packet transmitted from the delivery server to the outside is avoided.

Modifications of the second embodiment are described below.

The second embodiment is based on the premise that the transmission destination port number is already known by one of the user and the application program. According to a first modification of the second embodiment in contrast, the driver identifies a streaming delivery packet and automatically recognizes the port number from the packet itself. If a port number auto-recognition process is performed, one of the user and the application program may notify the driver B of a condition identifying the streaming delivery packet through configuration properties. If the driver is notified of the condition, a packet satisfying the condition becomes a target of the process. If the driver B is not particularly notified, it is determined whether the packet is a TCP/UDP packet or another packet. If a TCP packet is used for streaming delivery, all the TCP packets become targets of the process. If a UDP packet is used for streaming delivery, all the UDP packets become targets of the process.

FIG. 11 illustrates an initial state of the control table of the first modification.

In the first modification, the control table having a format of FIG. 11 is generated at the startup of the driver B. The transmission port number is automatically recognized after the driver B is started. A space for each transmission port number is produced, and the control table having the format of FIG. 3 is generated.

In the first modification, the transmission process of FIG. 4 is performed. The algorithm of the "queuing and non-streaming-delivery packet transmitting" (operation S01) of FIG. 4 is different from the algorithm (see FIG. 5) of the second embodiment.

Figure 12:
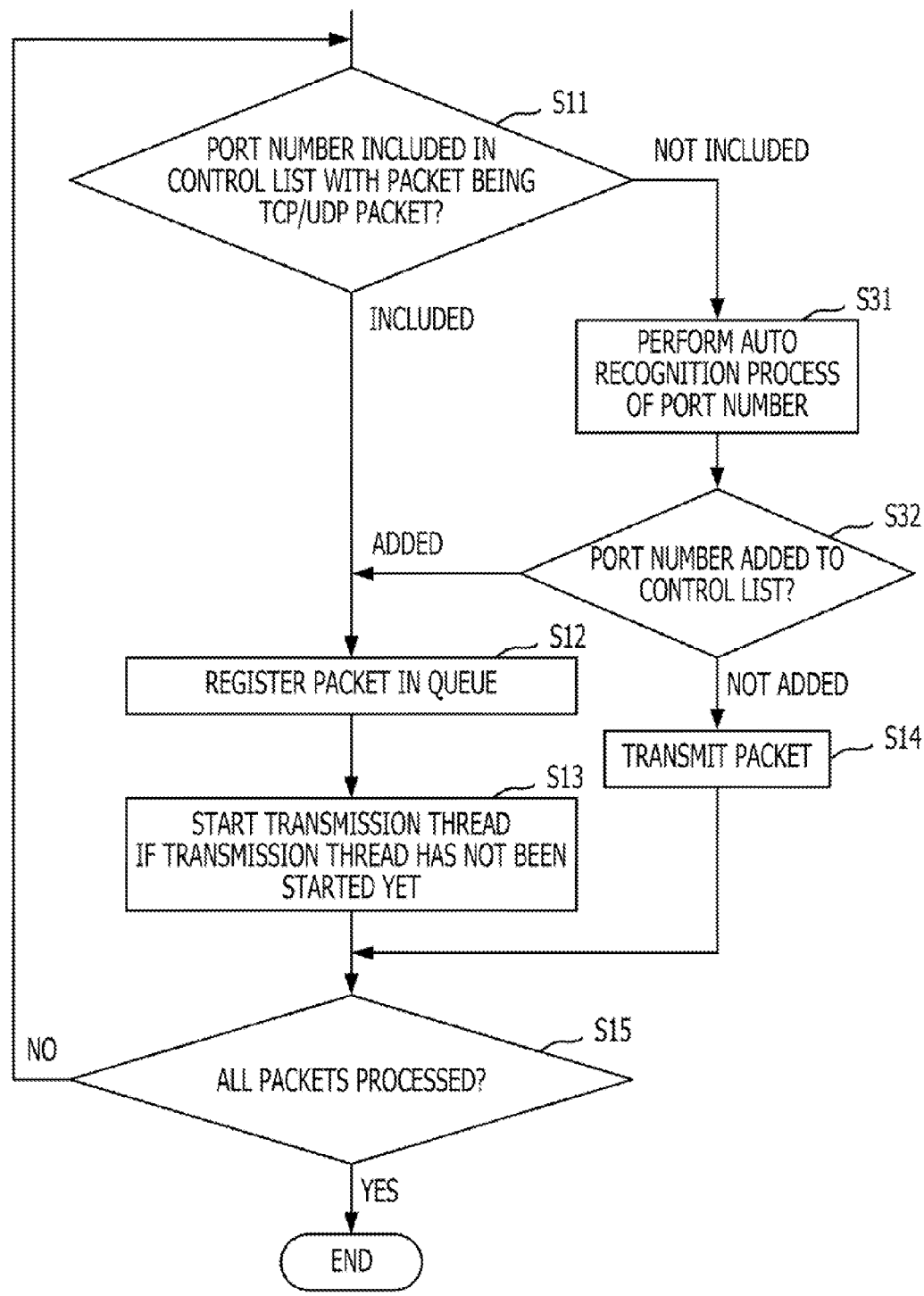
FIG. 12 is a flowchart illustrating a process of the "queuing and non-streaming-delivery packet transmitting unit" of FIG. 4 in the first modification.

FIG. 12 is a flowchart of the process of the "queuing and non-streaming-delivery packet transmitting" (operation S01) of FIG. 4 in the first modification of the second embodiment.

Operations S11 to S15 of FIG. 12 are respectively identical to operations S11 to S15 of the second embodiment illustrated in FIG. 5, and the discussion thereof is not repeated herein.

The port number auto-recognition process is performed in operation S31. It is then determined whether the port number is added to the control table (operation S32). If the port number is added to the control table, processing proceeds to operation S12. If the port number is not added to the control table, processing proceeds to operation S14.

Figure 13:
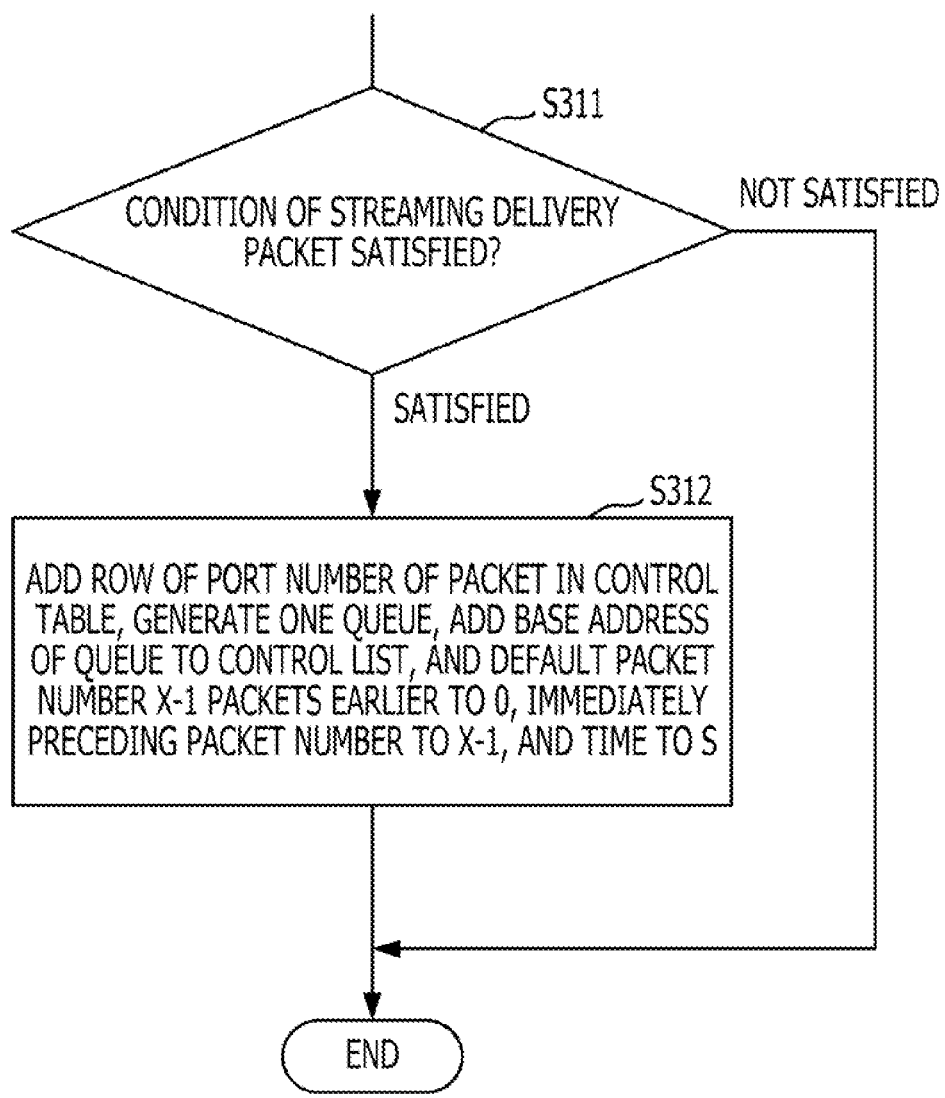
FIG. 13 is a flowchart illustrating a port number auto-recognition process (operation S31) in FIG. 12.

FIG. 13 is a flowchart of the port number auto-recognition process (operation S31) in FIG. 12.

It is then determined whether a packet as a determination target satisfies the condition of the streaming delivery packet (operation S311). If the packet satisfies the condition of the streaming delivery packet, processing proceeds to operation S312. A row of the port number of the packet is added to the control table, and a queue for the port number is generated on a memory (not illustrated). The base address of the queue is added to the control table. The packet number earlier in time by X−1 packets is defaulted to 0, the immediately preceding packet number is defaulted to X−1, and time (0)−time (X−1) are defaulted to S (see FIG. 3). As described with reference to FIG. 3, time S is sufficient earlier in time than the transmission start time.

If the condition of the stream delivery packet is not satisfied in operation S311 of FIG. 13, nothing is added to the control table, and the port number auto-recognition process thus ends.

According to the first modification, the transmission destination port number of the packet for streaming delivery is automatically recognized.

Figure 14:
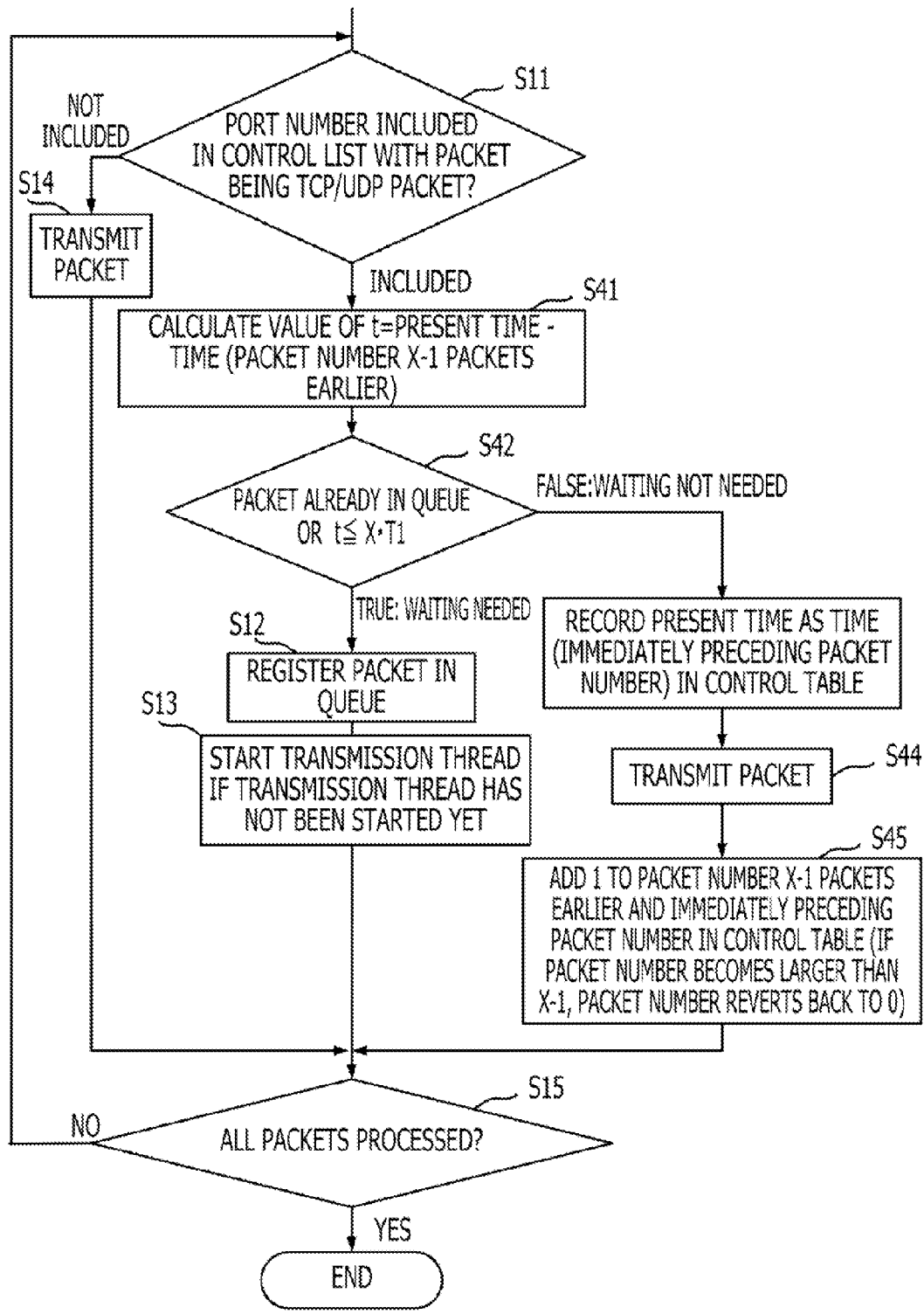
FIG. 14 illustrates a process of the "queuing and non-streaming-delivery packet transmitting unit" of FIG. 4 in a second modification of the second embodiment.

FIG. 14 illustrates the process of the "queuing and non-streaming-delivery packet transmitting" (operation S01) of FIG. 4 in a second modification of the second embodiment.

Operations S11 to S15 of FIG. 14 are respectively identical to operations S11 to S15 of the second embodiment illustrated in FIG. 12, and the discussion thereof is not repeated herein.

In operation S41, t=present time−time (packet number X−1 packets earlier) is calculated.

It is then determined in operation S42 whether a packet is already present in the queue, and whether the condition of $t \leq X \cdot T1$ is satisfied. If a packet is already present in the queue, a current packet is also registered in the queue (operation S12). If the condition of $t \leq X \cdot T1$ is satisfied with the queue empty, processing also proceeds to operation S12, and the current packet is also registered.

No waiting process is necessary if the condition of $t \leq X \cdot T1$ is satisfied with no packet. According to the second modification, the packet transmission process is thus performed with the current packet unregistered. More specifically, the present time is recorded at time (the latest packet number) in the control table (operation S43). The packet transmission process is performed (operation S44). Furthermore, 1 is added to the packet number of the packet earlier by X−1 packets and the latest packet number in the control table (operation S45). With 1 added to the control table, the packet number, if increased above X−1, reverts back to 0.

According to the second embodiment, the packet is registered in the queue even if the packet is ready to be transmitted without the need for the transmission waiting (see operation S12 in FIG. 5). The transmission process is performed later via the transmission thread. The registration of the packet in the queue and the process through the transmission thread cause a delay even if the degree of delay is very small. According to the second modification of the second embodiment, the packet is registered in the queue only if the waiting process is needed. If no waiting is needed, the packet is directly transmitted without being registered in the queue. According to the second modification, a delay caused by the packet registration to the queue is avoided.

The second embodiment, and the first and second modifications thereof are based on the premise that the packet transmitting method is performed by the driver of the delivery server 30 in the system of FIG. 2. The embodiments are not limited to the system of FIG. 2 in which only the driver of the delivery server 30 performs the packet transmitting method. Another element may also perform the packet transmitting method.

Figure 15:
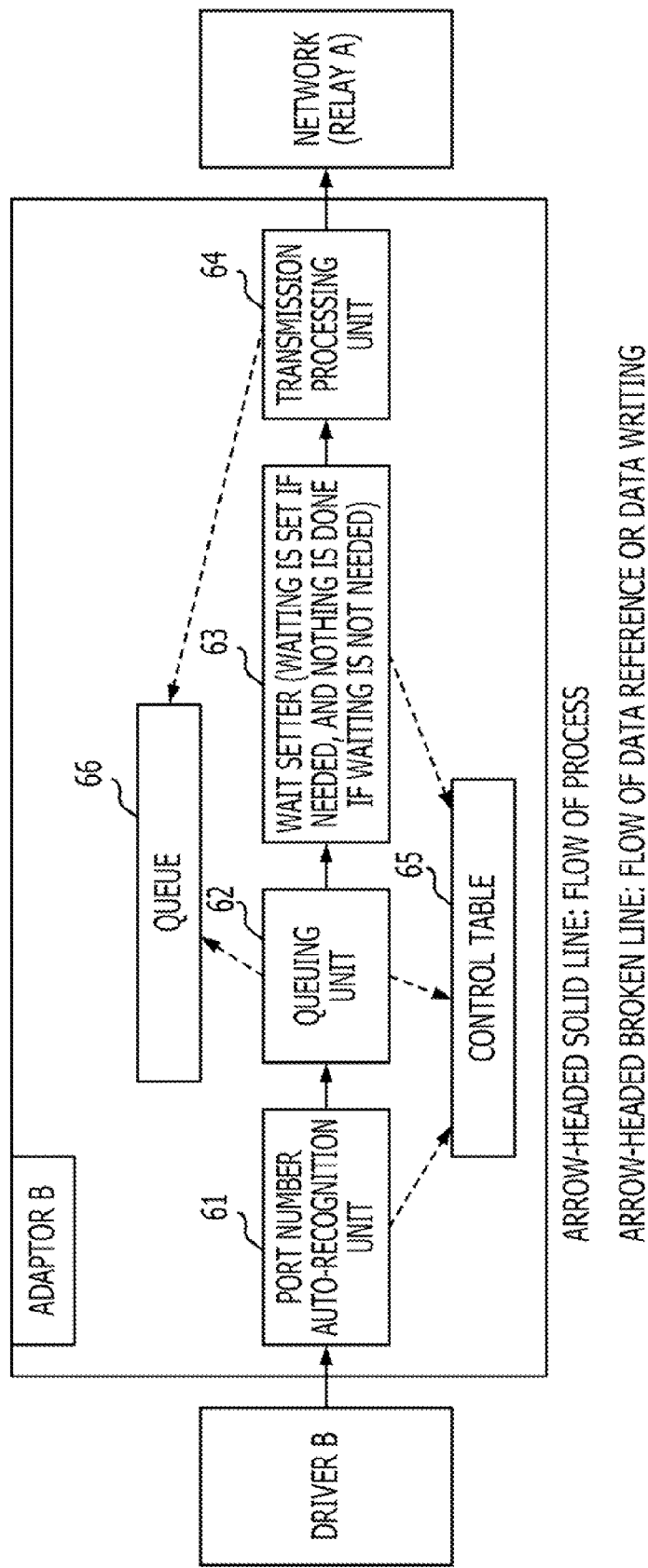
FIG. 15 illustrates a third modification of the second embodiment.

FIG. 15 illustrates a third modification of the second embodiment.

As illustrated in FIG. 15, an arrow-headed solid line represents the flow of the process, and an arrow-headed broken line represents data reference and data writing.

According to the third modification of FIG. 15, the adaptor B of the delivery server 30 of FIG. 2 performs the same process as the process of the second embodiment.

The control table 65 is also generated. The control table 65 has been discussed. If the process is performed by the driver B, the control table 65 is generated on a main memory of the delivery server 30. If the process is performed by the adaptor, the control table 65 is generated on a memory within the adaptor.

According to the second embodiment, the user or the application program notifies the driver of information (such as the port number, and the values of the parameters X, T, and T1). According to the third modification of the second embodiment, the user or the application program notifies the driver of the information, and then the driver notifies the adaptor of the information. When the adaptor performs the process, the port number auto-recognition process may be performed in the same manner as in the first modification.

Upon receiving a transmission packet from the driver B, the adaptor B transmits the received packet to a relay A 41 (see FIG. 2).

The adaptor B receives the packet from the driver B. A port number auto-recognition unit 61 determines whether the received packet has a port number registered in the control table 65. If the packet has a port number unregistered in the control table 65, that packet is not a control target. The packet passes through a queuing unit 62 and a waiting setter 63 with nothing done thereto, and is then transmitted as is by a transmission processing unit 64. The process of the port number auto-recognition unit 61 is identical to operation S11 described above with reference to FIG. 5. The transmission process of the packet having the port number unregistered in the control table 65 is identical to operation S13 of FIG. 5.

If the port number auto-recognition unit 61 determines that the packet has a port number registered in the control table 65, the queuing unit 62 then registers the packet in A queue 66 (this operation is identical to operation S12 of FIG. 5).

The waiting setter 63 references the control table 65, and determines whether to keep waiting the transmission of the packet registered in the queue. If it is determined that the transmission of the packet needs to be kept waiting, the waiting setter 63 instructs the transmission processing unit 64 to transmit the packet after waiting for time determined through calculation. If it is determined that the transmission of the packet does not need to be kept waiting, the waiting setter 63 instructs the transmission processing unit 64 to transmit the packet immediately.

Upon receiving the transmission instruction from the waiting setter 63, the transmission processing unit 64 extracts the packet from the queue 66 and then transmits the packet to the relay A.

The process of the waiting setter 63 and the transmission processing unit 64 is identical to the process of the second embodiment illustrated in FIG. 6. The process of FIG. 6 is different from the process of FIG. 15 as described below. The packet is kept waiting as necessary after being extracted from the packet in the process of FIG. 6. The packet is extracted from the control table 65 after a waiting time permitted as necessary in the process of FIG. 15. This difference is not attributed to the difference between one process with the driver used and the other process with the adaptor used. The third modification is applicable to any process.

FIG. 16 illustrates a control table of a fourth modification of the second embodiment.

The function of the second embodiment is implemented in the application program of the delivery server 30 of FIG. 2.

The same process as in the driver is performed in the application program.

One process (or a thread) of the application program corresponds to one TCP port or one UDP port. Each process (thread) of the application program is free from controlling a plurality of TCP ports or a plurality of UDP ports. For this reason, the control table has one port number only as illustrated in FIG. 16. Each column of the control table has been discussed with reference to FIG. 3, and the discussion thereof is omitted here.

If the application program is implemented, the effectiveness of the application program depends on the premise that no burst takes place in a TCP (or UDP) layer and an IP layer (see FIG. 2) in the course of the transfer from the application program to the driver.

The function of the second embodiment implemented in the relay A of FIG. 2 is described as a fifth modification.

If the minimum storage capacity queue is present in the relay B or the client terminal illustrated in FIG. 2, the function of the second embodiment or each modification of the second embodiment is implemented in the relay A in order to prevent a buffer (queue) from overflowing.

If the function is implemented in the relay A, it is typically difficult to automatically determine the parameters T, X, T1, and the like. In such a case, the user may need to specify the parameters in the relay A.

The modifications of the second embodiment have been discussed. An example of the determination method of the parameters T, X, and T1 is described below.

If the user knows the parameters T, X, and T1, the user may simply specify the values of these parameters. The user may not necessarily know the parameters. A measurement program is thus implemented, and a method of determining the values of these parameters using the measurement program is described below. The values of the parameters are automatically determined. One of the application program, the driver, and the adaptor on the delivery server 30 may also automatically measures the values of the parameters. As described above, the relay is typically insufficient to implement the measurement program therewithin.

The following discussion is based on the premise that TCP is used. If UDP is used, a modification is needed. Such a modification is also described below.

Figure 17:
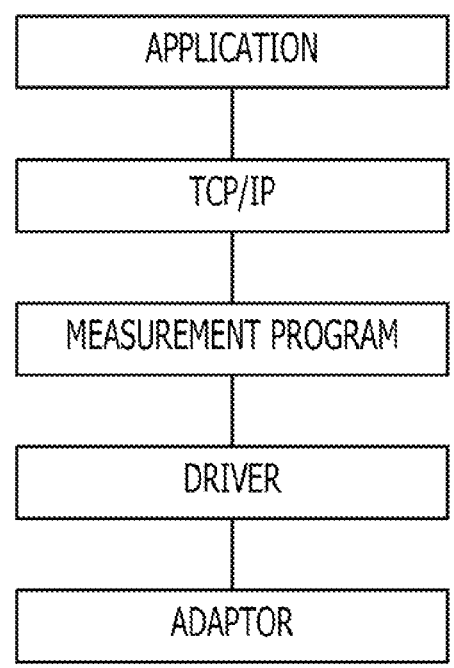
FIG. 17 illustrates a layout position of a measurement program.

FIG. 17 illustrates a layout position of the measurement program.

The TCP packet is transmitted via unicast, and one TCP port number corresponds to one client terminal. The measurement program operates between TCP/IP and the driver on the delivery server as illustrated in FIG. 17.

If the measurement program is initiated with the encoder 21 of FIG. 2 transmitting streaming delivery packets, the values of the parameters T, X, and T1 are determined in the order of (1) to (5) as described below.

(1) Determination of the Value of T

The measurement program determines the mean value of transmission time intervals of a large number of packets (10000 packets, for example). Let T represent the mean value of transmission time intervals. There is a possibility that a deviation takes place in the time intervals between the packets. If the mean value of a large number of packets is taken, the resulting value may be approximately equal to the true packet time interval of T.

(2) Determination of the Value of X

The measurement program causes K packets to be stored, and then transmits the K packets with time intervals of 0. In this case, the interval between the packets is longer than the infinitesimal interval (Inter Packet Gap defined by IEEE802.3), but is still negligibly small in comparison with the time intervals of the stream delivery packets.

K starts with 2, and is incremented by 1 like 3, 4, 5, 6, . . .

If retransmission via TCP is not detected after K packets are transmitted, K+1 packets are then transmitted with time intervals of 0.

The packet count K of the packets transmitted with time intervals of 0 is increased. A retransmission request via TCP is detected. The value resulting from subtracting 2 from K at that moment (K−2) is set to be X.

Figure 18:
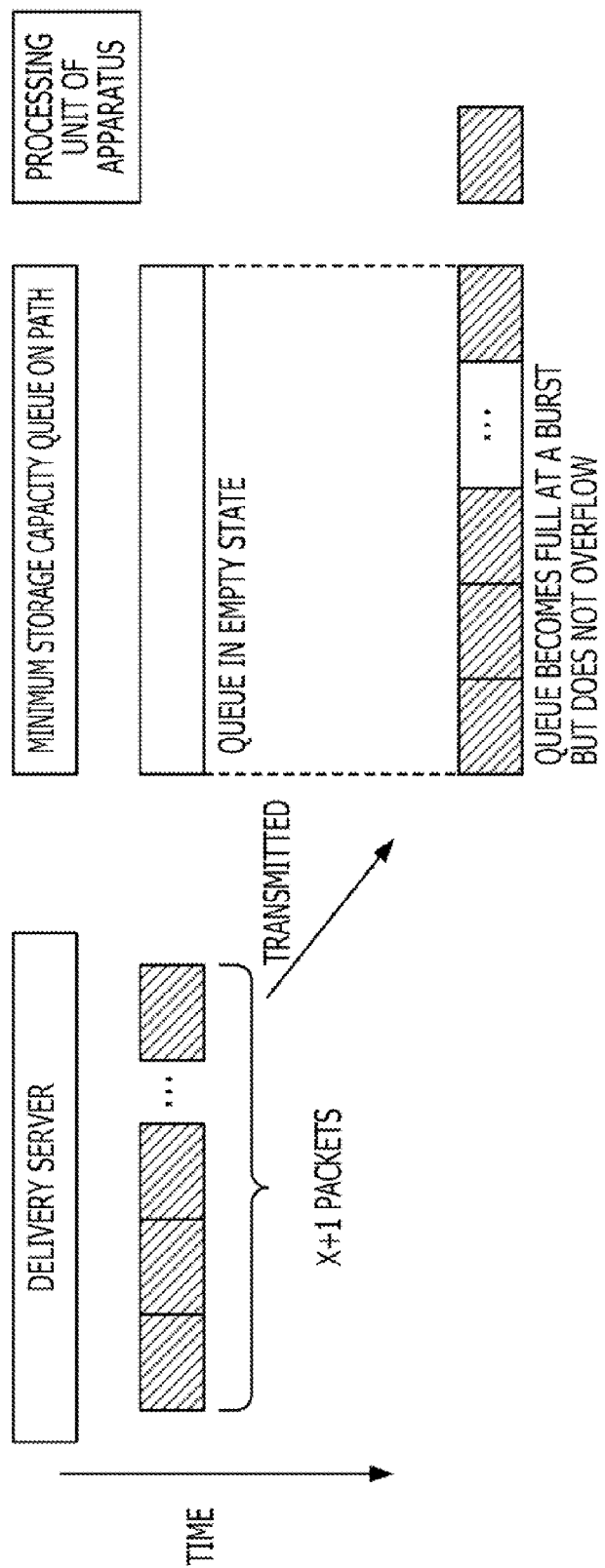
FIG. 18 diagrammatically illustrates X+1 packets that are transmitted at time intervals of 0.

FIG. 18 diagrammatically illustrates the transmission of X+1 packets with time intervals of 0.

The delivery server may now transmit X+1 packets concurrently.

In such a case, one leading packet is immediately extracted from the minimum storage capacity queue by a processing unit of the apparatus having the minimum storage capacity queue, and the minimum capacity storage queue is then immediately filled with X packets including the second packet through (X+1)-th packet.

However, no overflow takes place in this case.

Figure 19:
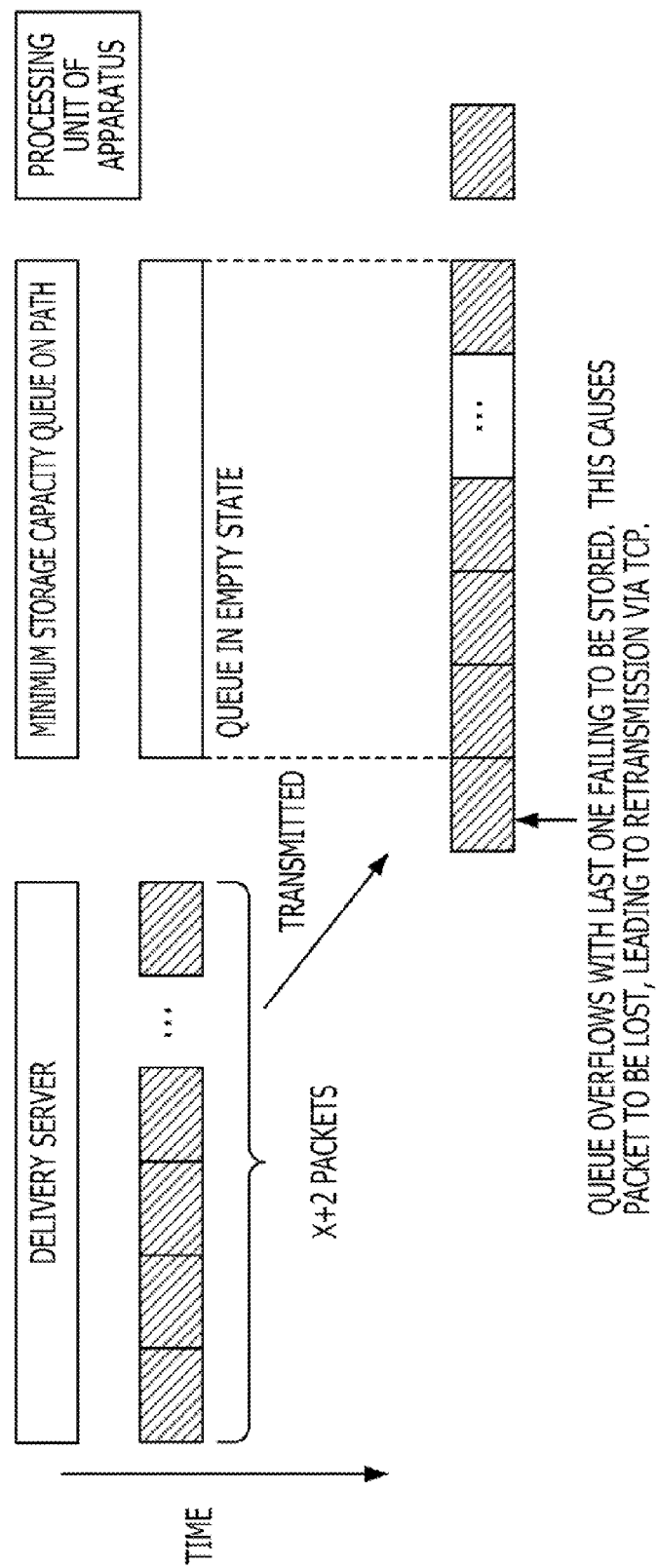
FIG. 19 diagrammatically illustrates X+2 packets that are transmitted at time intervals of 0.

FIG. 19 diagrammatically illustrates an operation in which X+2 packets are transmitted with time intervals of 0.

If X+2 packets are concurrently transmitted from the delivery server, one last packet, i.e., the (X+2)-th packet fails to enter the queue, causing an overflow. This is a packet loss, leading to a retransmission via TCP.

At the moment a retransmission via TCP is detected, the value resulting from subtracting 2 from K at the time (K−2) becomes X.

(3) Determination of the Value of T1

X+2 packets are then transmitted with packet time intervals of M after the measurement program stores X+2 packets.

The time interval of M is increased in steps of 1 ms, such as to 2 ms, 3 ms, 4 ms, . . .

If a retransmission via TCP is detected after X+2 packets are transmitted with time intervals of M ms, X+2 packets are stored again and the value of M is incremented by 1.

If no retransmission via TCP is detected after the packets are transmitted with the time intervals of M ms, the value of M is set to be M_2.

X+3 packets are then transmitted with packet time intervals of M after the measurement program stores X+3 packets. The value of M starts with M_2. The same process as the process with the X+2 packets is performed. When no transmission via TCP is detected, the value of M is set to be M_3.

X+4 packets are then transmitted with time intervals of M after the measurement program stores X+4 packets. The value of M starts with M_3. The same process as the process with the X+2 packets is performed. When no transmission via TCP is detected, the value of M is set to be M_4.

A similar process is performed with X+n packets (n=5, 6, . . .) stored.

If no increase in M_n is detected several times consecutively (4 times, for example), M_n is set to be T1. For example, if M_100=M_101=M_102=M_103, the value is set to be T1.

A time resolution is 1 ms in this case. In order to determine T1 at an even higher accuracy, the time resolution may be set to be 100 microseconds. T1 is determined with such a time resolution in the same method as described above.

T1 determined in the method described above equals the time of the processing of one packet in the queue on the path. This fact is diagrammatically described below.

Figure 20:
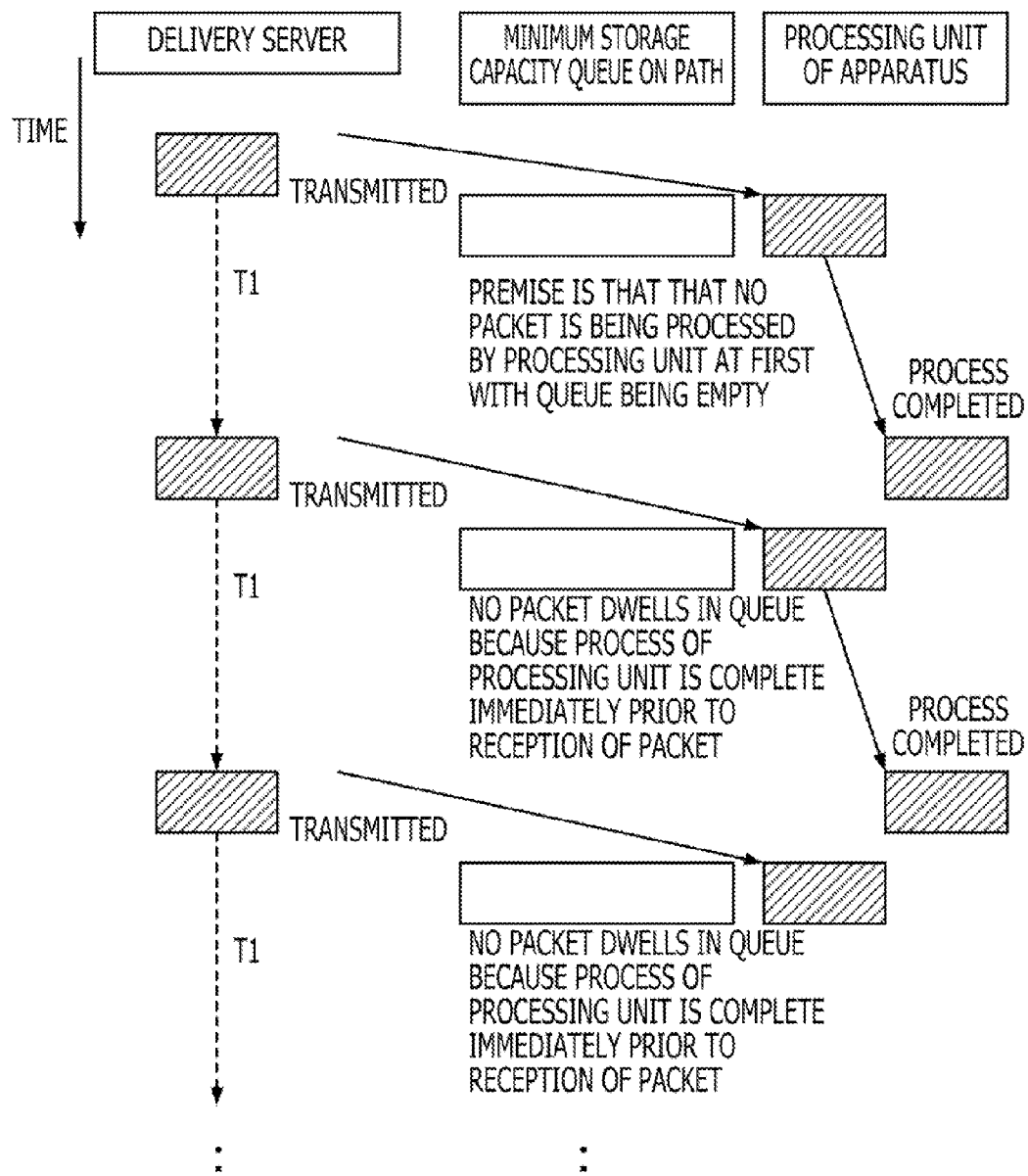
FIG. 20 illustrates packets that are transmitted at time intervals of T1.

FIG. 20 illustrates the packets that are transmitted with the transmission time interval of T1.

The following discussion is based on the premise that the minimum storage capacity queue on the path is empty first, and that no packet is being processed by a processing unit in an apparatus having the minimum storage capacity queue.

In such a case, no packet dwells on the queue because the processing unit has completed the process of the immediately preceding received packet prior to the reception of the next packet. Even if packets of any number are transmitted, the queue is free from overflowing.

The discussion here is based on the premise that the queue is empty. If the packets are transmitted with the transmission time intervals of T1, no overflow takes place as long as at least one empty space is available in the queue.

Figure 21:
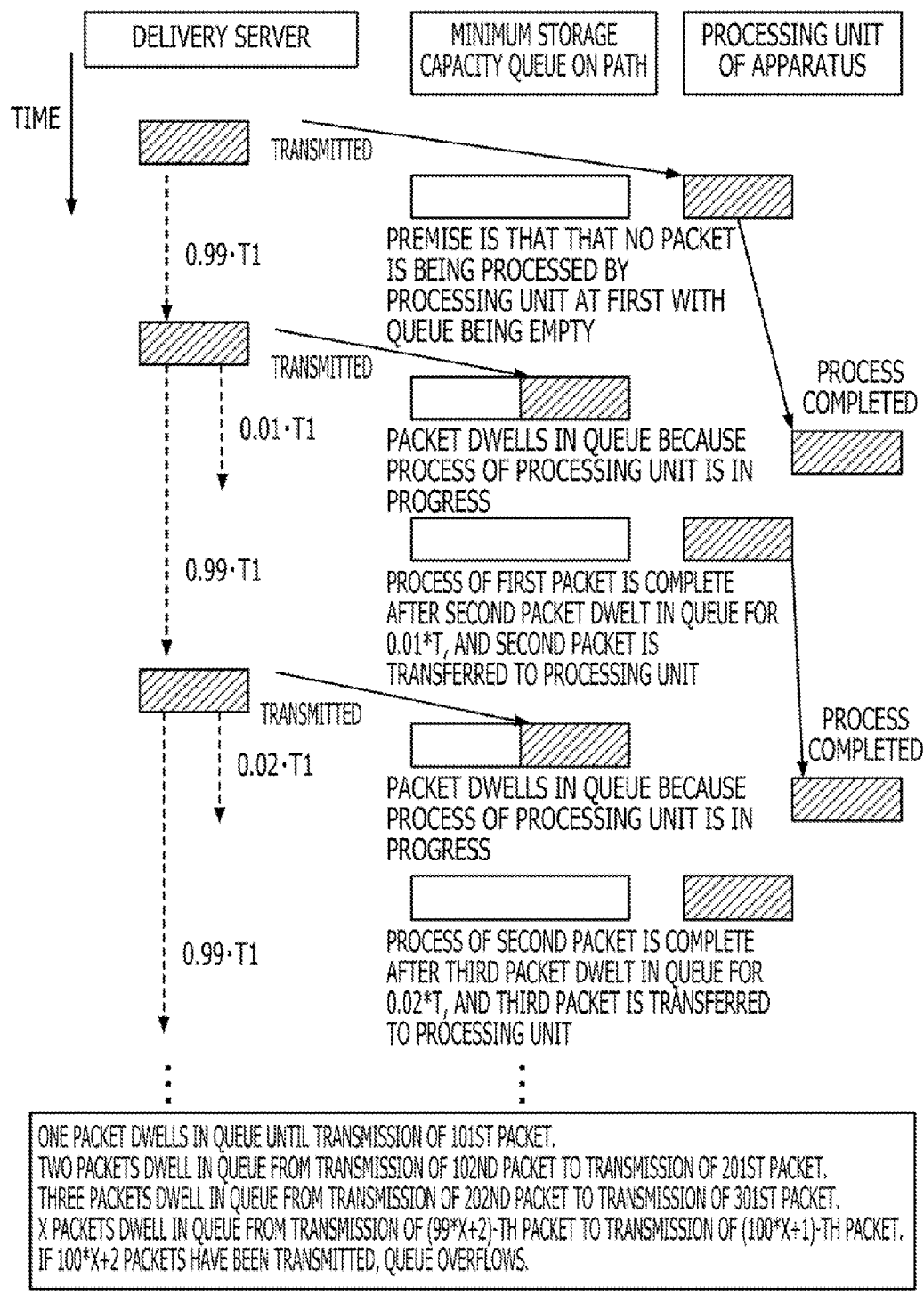
FIG. 21 illustrates packets that are transmitted at time intervals of 0.99·T1.

FIG. 21 illustrates the packets that are transmitted with the transmission time intervals of 0.99·T1.

The discussion here is also based on the premise that the minimum storage capacity queue on the path is empty first, and that no packet is being processed by a processing unit in an apparatus having the minimum storage capacity queue.

The first packet simply passes through the queue, and is then processed by the processing unit in the apparatus.

When the second packet is transmitted and received, the second packet dwells on the queue because the leading packet is still being processed by the processing unit. The processing of the first packet is completed 0.01·T1 after the start of the dwelling of the second packet on the queue. The second packet is then transferred to the processing unit.

When the third packet is received, the second packet is being processed by the processing unit. The third packet thus dwells on the queue. The processing of the second packet is completed 0.02·T1 after the start of the dwelling of the third packet on the queue. The third packet dwelling on the queue is then transferred to the processing unit.

The state in which one packet dwells on the queue continues until a 101st packet is transmitted. Two packets dwell on the queue during the transmission of 102nd through 201st packets. Similarly, three packets dwell on the queue during the transmission of 202nd through 301st packets. Similarly, X packets dwell on the queue during the transmission of (100·(X−1)+2)-th through (100·X+1)-th packets. If 100·X+2 packets are transmitted, the queue overflows. The discussion here is also based on the premise that the queue is empty first. If a packet dwells on the queue, the queue overflows earlier.

If the packets are transmitted with the transmission time intervals of T1 or longer, the minimum storage capacity queue is free from overflowing. If the packets are transmitted with a transmission time interval even slightly shorter than T1, the minimum storage capacity queue suffers from overflowing.

The method (3) determines the time interval of T1 with which the packets stored on the minimum storage capacity queue are successively extracted from the minimum storage capacity.

(4) Displaying and Setting

The parameters T, X, and T1 determined in the methods (1) to (3) are displayed on a display (not illustrated). The measurement program may automatically set the values of T, X, and T1 on the application program, the driver, or the adaptor.

(5) Ending of the Measurement Program

The measurement program ends. The measurement program, after being started, automatically ends if the methods (1)-(4) are complete.

The determination methods of the parameters T, X, and T1 are based on the premise that TCP is used in streaming delivery. The determination methods of the parameters T, X, and T1 with UDP used instead of TCP are described below.

The determination method of T is not different between TCP and UDP, and the method (1) is directly applied.

Although TCP supports the retransmission process, UDP does not support the retransmission process.

Since TCP transmits packets in unicast, one port number corresponds to one client terminal. A multicast transmission is typically performed in UDP, and the port number corresponds to a plurality of client terminals.

In UDP, one of the client terminals corresponding to the port number is provided with a packet loss detection program which detects a packet loss and notifies a transmission source of the detected packet loss. The packet loss detection program detects a packet loss, and returns the detection results to the delivery server. The parameters X and T1 are thus determined in the same manner as in the methods (2) and (3).

FIGS. 22A and 22B and 23A and 23B illustrate operation positions of the measurement program and the packet loss detection program in UDP.

Figure 22A:
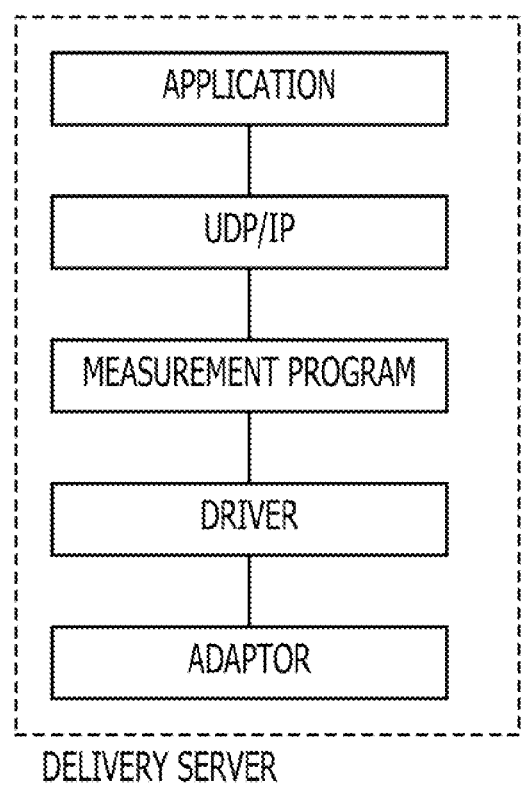
FIGS. 22A and 22B illustrate operation positions of the measurement program and a packet loss program with UDP used.
Figure 22B:
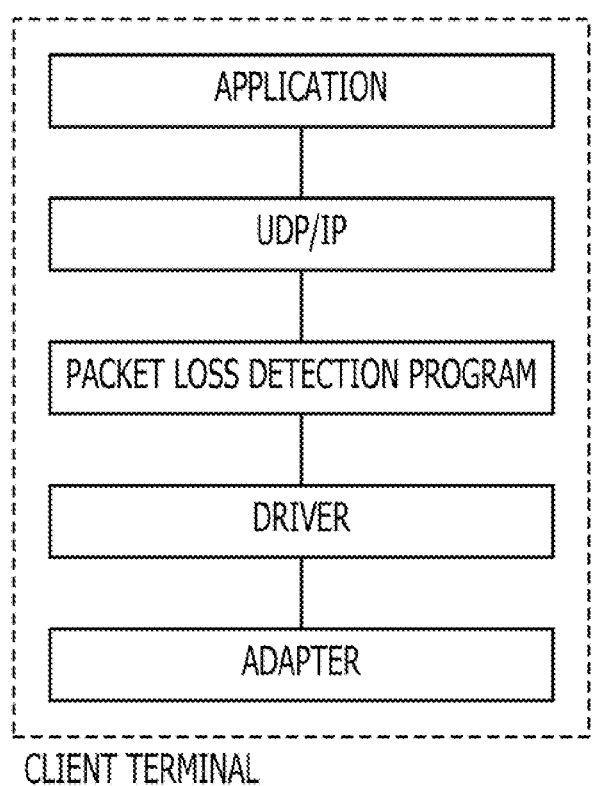

The measurement program operates between UDP/TCP and the driver on the delivery server as illustrated in FIG. 22A, and the packet loss detection program operates between UDP/TCP and the driver on the client terminal as illustrated in FIG. 22B. The measurement program operates between the application program and UDP/TCP on the delivery server as illustrated in FIG. 23A, and the packet loss detection program operates between the application program and UDP/IP on the client terminal as illustrated in FIG. 23B.

Figure 23A:
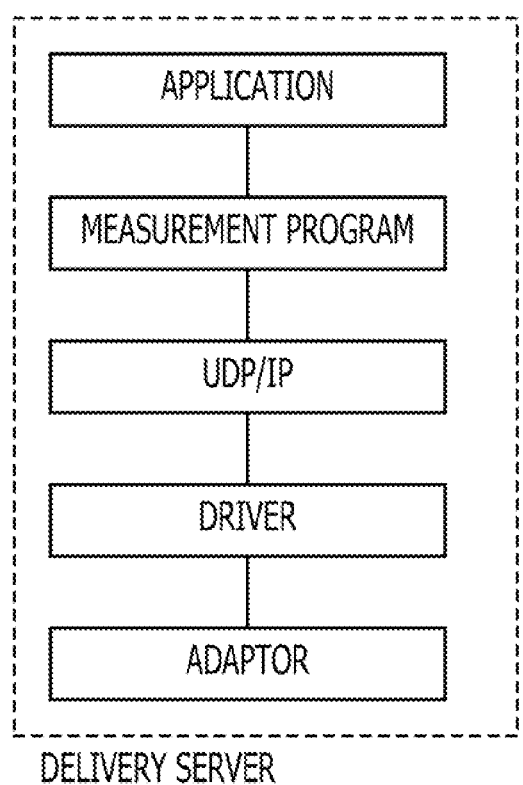
FIGS. 23A and 23B illustrate operation positions of the measurement program and the packet loss program with UDP used.
Figure 23B:
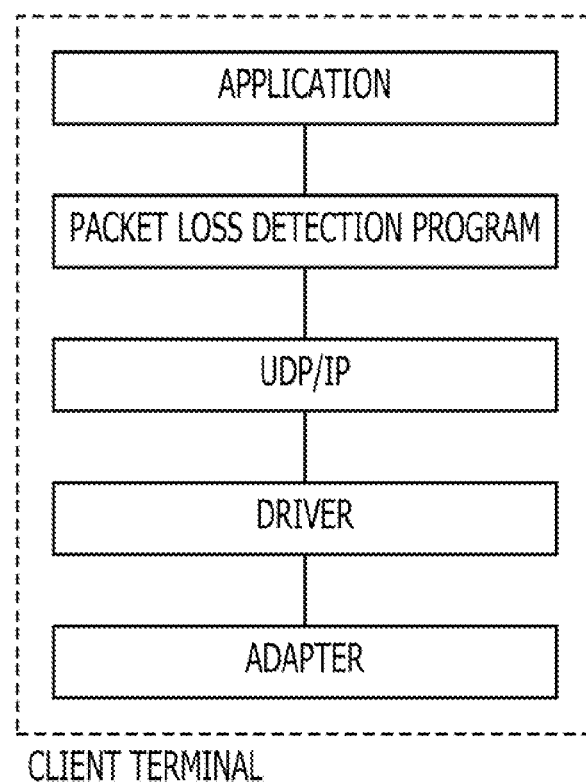

In this way, the measurement program and the packet loss detection program may operate between UDP/TCP and the driver as illustrated in FIGS. 22A and 22B, and may operate between the application program and UDP/TCP as illustrated in FIGS. 23A and 23B.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A packet transmitting apparatus for transmitting a received packet to a transmission destination apparatus, the packet transmitting apparatus comprising:
   a storage including a plurality of queues; and
   a processor configured to:
   determine whether an elapsed time t is longer than a first threshold time X·T1, the elapsed time t is a time elapsed from the transmission time of a packet transmitted earlier than the latest transmitted packet by X−1 packets, X being a maximum number of packets that a minimum storage capacity queue can store, the minimum storage capacity queue is a queue having a smallest storing capacity, from among the plurality of queues, for temporarily storing received packets on a transmission pass to the transmission destination apparatus, the capacity being based on a number of packets, and T1 being a time interval with which packets stored in the minimum storage capacity queue are successively extracted;
   transmit the unsent packet without delaying the transmission of the unsent packet when a determination is made that the elapsed time t is longer than the first threshold time X·T1;
   transmit the unsent packet after delaying the transmission of the unsent packet when a determination is made that the elapsed time t is shorter than the first threshold time X·T1;
   detect the packet count X that the minimum storage capacity queue can store by transmitting packets to the transmission destination apparatus by changing a number of packets to be simultaneously transmitted; and
   detect a maximum number of packets that does not cause a retransmission request.

2. The packet transmitting apparatus according to claim 1, wherein the processor is further configured to delay the transmission of the unsent packet for a time in which the elapsed time t is subtracted from a second threshold time (X·T) when the determination is made that the elapsed time t is shorter than the first threshold time X·T1, with T being a packet mean reception time interval of the packet receiving unit, and a time interval T2 for transmitting packets being T1<T2<T.

3. The packet transmitting apparatus according to claim 1, wherein the processor is further configured to:
   store a control table that lists transmission times of X transmitted packets from a packet transmitted earlier than a latest transmitted packet by X−1 packets down to the latest transmitted packet,
   update the transmission time in the control table in response to the transmission of the unsent packet,
   determine the transmission time of the packet transmitted earlier than the latest transmitted packet by X−1 packets by referring to the control table and calculate the elapsed time t, and determine whether the elapsed time t is longer than the first threshold time X·T1.

4. The packet transmitting apparatus according to claim 3, wherein the control table lists, for each destination apparatus, transmission time of each packet transmitted to the respective destination apparatus; and
   wherein the processor is further configured to update transmission times in the control table on a per transmission destination basis.

5. The packet transmitting apparatus according to claim 4, wherein the processor is further configured to monitor the transmission destination of each packet, and add a space for a new transmission destination in the control table when a packet to be transmitted to the new transmission destination is detected.

6. The packet transmitting apparatus according to claim 2, wherein the processor is further configured to:
   calculate a mean reception time interval T by calculating the mean value of reception time intervals of packets successively received by the receiving unit.

7. The packet transmitting apparatus according to claim 1, wherein the processor is further configured to:
   detect the time interval T1 by successively transmitting a plurality of packets with specific time intervals with the number of packets and the specific time interval changed, and detect the shortest time interval with which no retransmission request is detected when the number of packets is increased.

8. A packet transmitting method of receiving a packet, and transmitting the received packet to a transmission destination apparatus, the packet transmitting method comprising:
   determining whether an elapsed time t is longer than a first threshold time X·T1, the elapsed time t is a time elapsed from the transmission time of a packet transmitted earlier than the latest transmitted packet by X−1 packets, X being a maximum number of packets that a minimum storage capacity queue can store, the minimum storage capacity queue is a queue having a smallest storage capacity, from among the plurality of queues, on a transmission path to the transmission destination apparatus, the capacity being based on a number of packets, and T1 being a time interval with which packets stored in the minimum storage capacity queue are successively extracted;
   transmitting the unsent packet without delaying the transmission of the unsent packet when a determination is made that the elapsed time t is longer than the first threshold time X·T1;
   transmitting the unsent packet after delaying the transmission when a determination is made that the elapsed time t is shorter than the first threshold time X·T1;
   detecting the packet count X that the minimum storage capacity queue can store by transmitting packets to the transmission destination apparatus by changing a number of packets to be simultaneously transmitted; and
   detecting a maximum number of packets that does not cause a retransmission request.

9. The packet transmitting method according to claim 8, further comprising delaying the transmission of the unsent packet for a time in which the elapsed time t is subtracted from a second threshold time (X·T) when the determination is made that the elapsed time t is shorter than the first threshold time X·T1, with T being a packet mean reception time interval of the packet receiving unit, and a time interval T2 for transmitting packets being T1<T2<T.

10. The packet transmitting method according to claim 9, further comprising:
    calculating a mean reception time interval T by calculating the mean value of reception time intervals of packets successively received by the receiving unit.

11. The packet transmitting method according to claim 8, further comprising:
    storing a control table that lists transmission times of X transmitted packets from a packet transmitted earlier than a latest transmitted packet by X−1 packets down to the latest transmitted packet;
    updating the transmission time in the control table in response to the transmission of the unsent packet;
    determining the transmission time of the packet transmitted earlier than the latest transmitted packet by X−1 packets by referring to the control table;
    calculating the elapsed time t; and
    determining whether the elapsed time t is longer than the first threshold time X·T1.

12. The packet transmitting method according to claim 11, wherein the control table lists, for each destination apparatus, transmission time of each packet transmitted to the respective destination apparatus.

13. The packet transmitting method according to claim 12, further comprising updating transmission times in the control table on a per transmission destination basis.

14. The packet transmitting method according to claim 12, further comprising:
    monitoring the transmission destination of each packet; and
    adding a space for a new transmission destination in the control table when a packet to be transmitted to the new transmission destination is detected.

15. The packet transmitting method according to claim 8, further comprising:
    detecting the time interval T1 by successively transmitting a plurality of packets with specific time intervals with the number of packets and the specific time interval changed; and
    detecting the shortest time interval with which no retransmission request is detected when the number of packets is increased.

16. A non-transitory computer-readable medium storing therein a packet transmitting program that causes a computer to execute an operation for receiving a packet, and transmitting the received packet to a transmission destination apparatus, the operation comprising:
    determining whether an elapsed time t is longer than a first threshold time X·T1, the elapsed time t is a time elapsed from the transmission time of a packet transmitted earlier than the latest transmitted packet by X−1 packets, X being a maximum number of packets that a minimum storage capacity queue can store, the minimum storage capacity queue is a queue having a smallest storage capacity, from among the plurality of queues, on a transmission path to the transmission destination apparatus, the capacity being based on a number of packets, and T1 being a time interval with which packets stored in the minimum storage capacity queue are successively extracted;

transmitting the unsent packet without delaying the transmission of the unsent packet when a determination is made that the elapsed time t is longer than the first threshold time X·T1;

transmitting the unsent packet after delaying the transmission when a determination is made that the elapsed time t is shorter than the first threshold time X·T1;

detecting the packet count X that the minimum storage capacity queue can store by transmitting packets to the transmission destination apparatus by changing a number of packets to be simultaneously transmitted; and detecting a maximum number of packets that does not cause a retransmission request.

* * * * *